(12) United States Patent
Burman et al.

(10) Patent No.: US 11,295,260 B2
(45) Date of Patent: Apr. 5, 2022

(54) MULTI-PROCESS WORKFLOW DESIGNER

(71) Applicant: ServiceNow, Inc., Santa Clara, CA (US)

(72) Inventors: Jacob Burman, Carlsbad, CA (US); Craig Brian Santa Ruiz, Lakeside, CA (US); Harry Thomas Nelson, San Diego, CA (US); Derek Gregory Stainer, San Diego, CA (US); Nikhil Dvivedi, San Diego, CA (US); Russell Sarbora, Southern Shores, NC (US); Juell Chase Solaegui, San Diego, CA (US); Reynaldo Hernandez, Oceanside, CA (US); Alberto Alvarado Jimenez, Santee, CA (US); Michel Abou Samah, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/936,028

(22) Filed: Jul. 22, 2020

(65) Prior Publication Data
US 2022/0027806 A1 Jan. 27, 2022

(51) Int. Cl.
*G06Q 10/06* (2012.01)
(52) U.S. Cl.
CPC ... *G06Q 10/0633* (2013.01); *G06Q 10/06316* (2013.01)
(58) Field of Classification Search
CPC .......................................... G06Q 10/00–50/00
USPC ................................................ 705/7.11–7.42
See application file for complete search history.

(56) References Cited

U.S. PATENT DOCUMENTS

| 6,092,048 | A  | * | 7/2000  | Nakaoka  | G06Q 10/0631 |
|           |    |   |         |          | 705/7.15 |
| 6,578,006 | B1 | * | 6/2003  | Saito    | G06Q 10/04 |
|           |    |   |         |          | 705/7.26 |
| 6,944,622 | B1 | * | 9/2005  | Mitchell | G06Q 10/103 |
| 7,051,071 | B2 | * | 5/2006  | Stewart  | G06Q 10/06 |
|           |    |   |         |          | 709/204 |
| 7,155,720 | B2 | * | 12/2006 | Casati   | G06Q 10/10 |
|           |    |   |         |          | 718/104 |
| 7,184,967 | B1 | * | 2/2007  | Mital    | G06Q 10/10 |
|           |    |   |         |          | 705/7.26 |
| 7,403,948 | B2 | * | 7/2008  | Ghoneimy | G06Q 99/00 |
|           |    |   |         |          | 707/792 |

(Continued)

*Primary Examiner* — Alan S Miller
(74) *Attorney, Agent, or Firm* — Van Pelt, Yi & James LLP

(57) ABSTRACT

A first workflow item grouping container and a second workflow item grouping container are a part of a collection of workflow item grouping containers organizing an end-to-end multi-process workflow solution. An identification and execution condition of the first workflow item grouping container and an identification and execution condition of the second workflow item grouping container are received. A specification of one or more workflow items belonging to the first workflow item grouping container and a specification of one or more workflow items belonging to the second workflow item grouping container are received. Each of the one or more workflow items belonging to the first and second workflow item grouping containers has an individually configurable execution condition and corresponds to a different individual activity of the end-to-end multi-process workflow solution.

20 Claims, 15 Drawing Sheets

(56) References Cited

U.S. PATENT DOCUMENTS

| | | | | |
|---|---|---|---|---|
| 7,428,495 B2* | 9/2008 | Dhar | A61J 9/00 | 705/7.26 |
| 7,640,548 B1* | 12/2009 | Yu | G06Q 10/10 | 718/106 |
| 7,805,327 B1* | 9/2010 | Schulz | G06Q 10/06316 | 705/7.26 |
| 9,483,307 B2* | 11/2016 | Turner | G06F 3/0484 | |
| 2002/0040312 A1* | 4/2002 | Dhar | G06Q 40/025 | 705/7.26 |
| 2002/0078432 A1* | 6/2002 | Charisius | G06Q 10/06 | 717/102 |
| 2002/0138577 A1* | 9/2002 | Teng | G06Q 10/10 | 709/205 |
| 2002/0152254 A1* | 10/2002 | Teng | G06F 21/41 | 718/100 |
| 2002/0188597 A1* | 12/2002 | Kern | G06Q 30/06 | |
| 2003/0149714 A1* | 8/2003 | Casati | G06Q 10/10 | 718/100 |
| 2004/0078373 A1* | 4/2004 | Ghoneimy | G06Q 10/10 | |
| 2004/0187089 A1* | 9/2004 | Schulz | G06Q 10/06 | 717/101 |
| 2006/0074730 A1* | 4/2006 | Shukla | G06Q 10/0633 | 705/7.27 |
| 2006/0074735 A1* | 4/2006 | Shukla | G06F 8/34 | 705/80 |
| 2006/0224702 A1* | 10/2006 | Schmidt | G06Q 10/10 | 709/219 |
| 2007/0276715 A1* | 11/2007 | Beringer | G06Q 10/0633 | 705/7.27 |
| 2008/0046834 A1* | 2/2008 | Yu | G06Q 10/10 | 715/771 |
| 2011/0078426 A1* | 3/2011 | Stoitsev | G06Q 10/04 | 712/244 |
| 2011/0282829 A1* | 11/2011 | Rangaswamy | G06Q 10/06 | 707/608 |
| 2013/0179208 A1* | 7/2013 | Chung | G06Q 10/06 | 705/7.15 |
| 2015/0067687 A1* | 3/2015 | Turner | G06F 9/4881 | 718/102 |
| 2018/0322439 A1* | 11/2018 | Dudani | G06Q 10/1097 | |

* cited by examiner

1100

New hire documentation

Short description*
Lorem ipsum dolor sit amet, consectetur adipiscing elit.

Description*
Lorem ipsum dolor sit amet, consectetur adipiscing elit. Quisque gravida velit neque, sit amet semper mi imperdiet vitae. Nam a lectus finibust, rhoncus nibh. Phasellus eget blandit odio.

Badge*

☑ Active

☑ Wait for completion

☑ Visible

Author Criteria*
( ITIL Process Owner ✕ )

Action plan   Activity type

Action Plan*
Run rules engine

Inputs

Channel name *
( Trigger → Incident Record → Number ✕ ) Rules engine    Visible

Private
    Visible

Members*
( Trigger → Incident Record → Watchlist ✕ )    Visible

Cancel    Save

FIG. 11

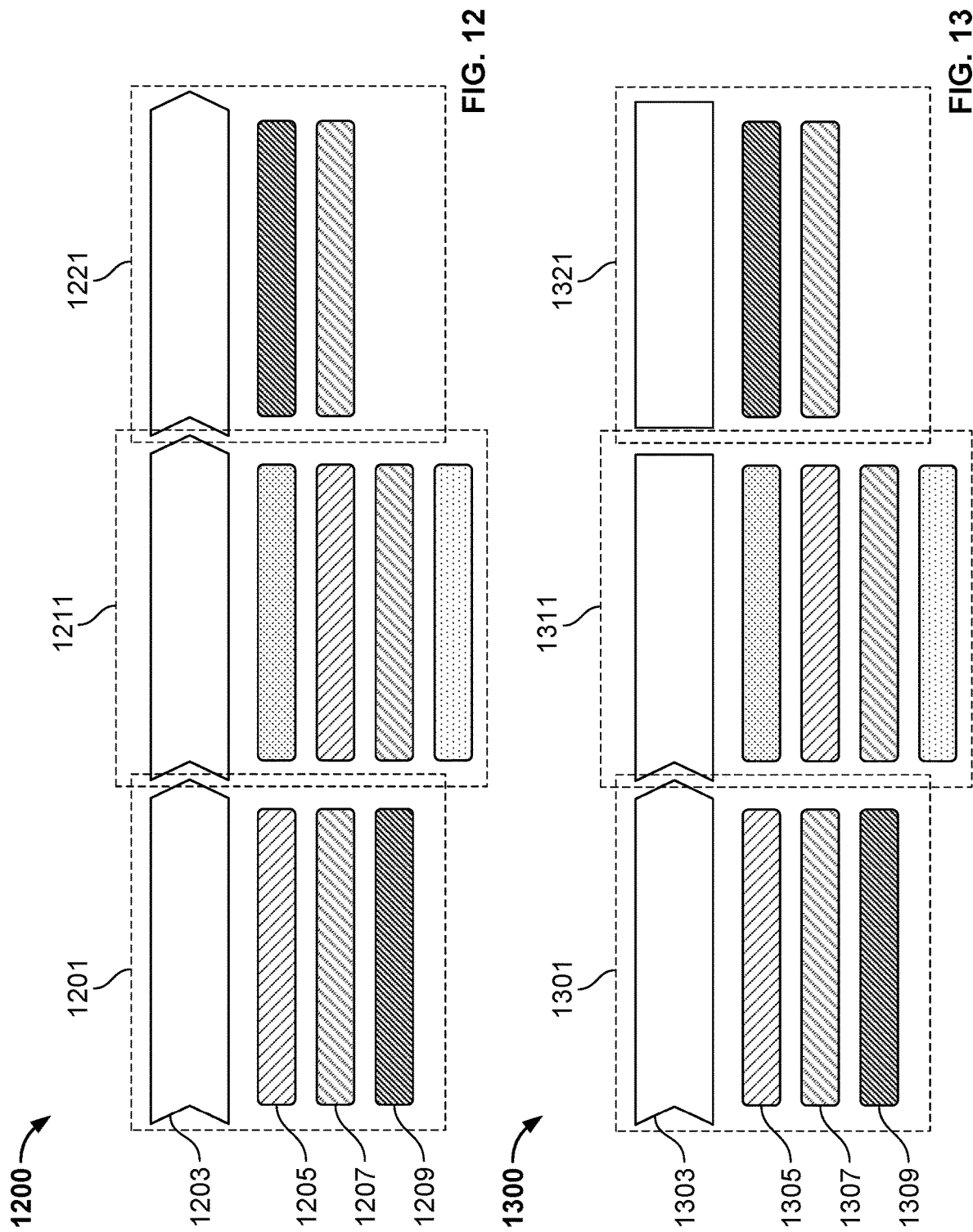

| Search Actions | | |
|---|---|---|
| Installed Spokes  < | Default | Create Record |
| (now) ServiceNow Core | ⚙ Add Worknote Link to Context | Creates a record on any ServiceNow table. You can dynamically add and configure fields for the record. Server-side validation rules are enforced (data policy, business rules, dictionary-defined mandatory fields), but UI policy does not apply. |
| (now) Action Status | ⚙ Ask For Approvals | |
| Adobe Sign | ⚙ Create or Update Record | |
| AWS | ⚙ Create Record | |
| Box | ⚙ Create Task | |
| Concur | ⚙ Delete Record | |
| Connect | ⚙ Log | |
| (now) Customer Service Case Action Status | ⚙ Look Up Record | |

FIG. 15

MULTI-PROCESS WORKFLOW DESIGNER

BACKGROUND OF THE INVENTION

Digitizing a workflow process can often increase the efficiency of performing the process. For example, converting a series of tasks to a digital and automated process can save a significant amount of time and resources. This can be especially true when the tasks are complex, repetitive, and/or include many individual steps. Typically, a workflow is digitized by programmers and/or someone with intimate knowledge of the digital tools used to execute the digitalized workflow. The conversion can apply to a variety of different tasks such as business processes, structured activities that require specific sequences, process-oriented objectives, etc. In many cases, the digitizing and automating of tasks results in a more consistent user experience.

BRIEF DESCRIPTION OF THE DRAWINGS

Various embodiments of the invention are disclosed in the following detailed description and the accompanying drawings.

FIG. 11 is a diagram illustrating an example user interface of a workflow design tool for authoring of an activity definition.

FIG. 12 is a diagram illustrating an example user interface of a workflow design tool for displaying process execution.

FIG. 13 is a diagram illustrating an example user interface of a workflow design tool for displaying process execution.

FIG. 15 is a diagram illustrating an example user interface of a workflow design tool for selecting activities.

DETAILED DESCRIPTION

Figure 1:
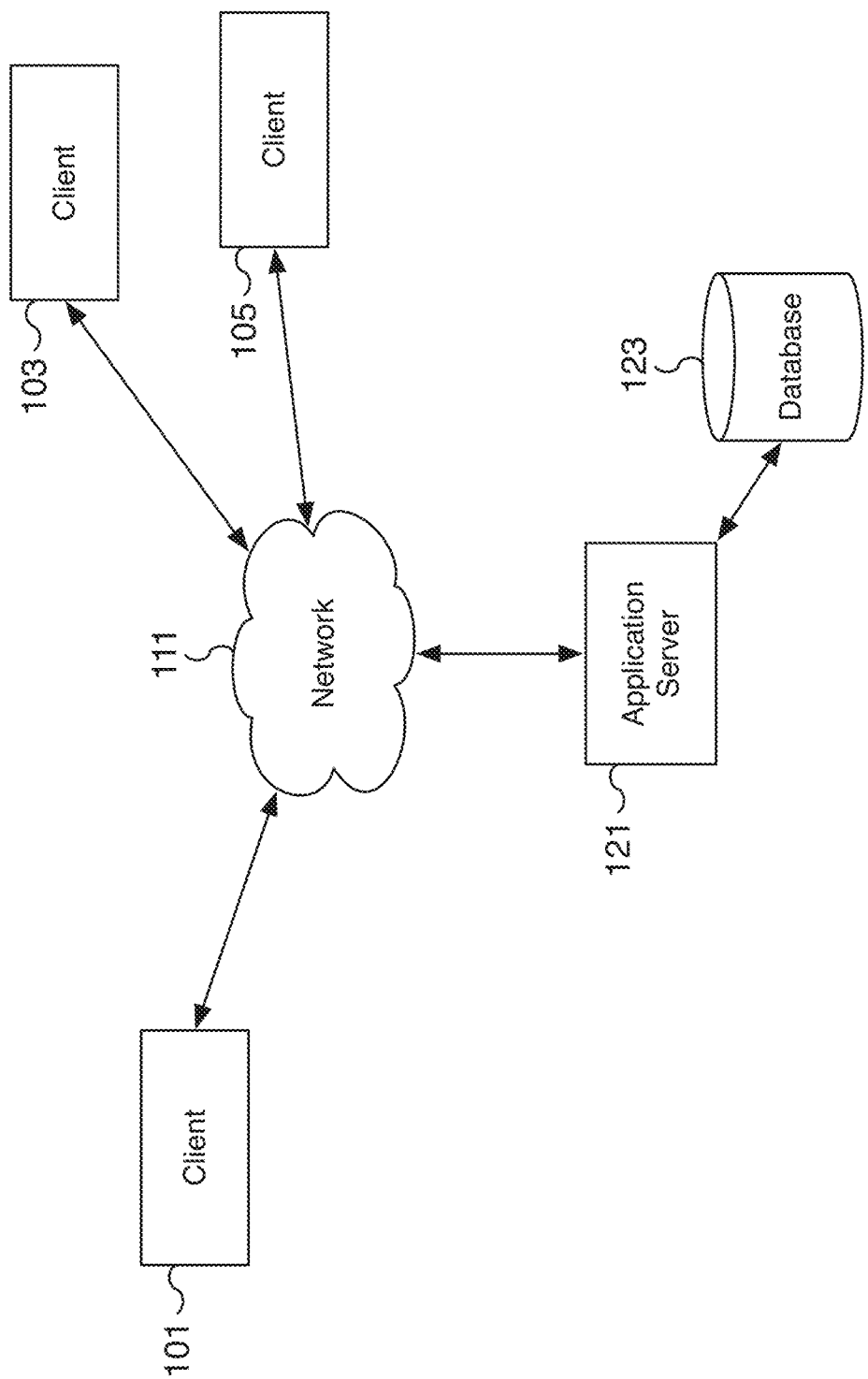
FIG. 1 is a block diagram illustrating an example of a network environment for creating and utilizing a multi-process workflow solution.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for digitizing and automating a workflow process are disclosed. For example, a multi-process workflow is digitized and automated to run on a software-as-a-service platform. Examples of multi-process workflows that can be digitized and automated include workflows related to onboarding a new employee, triaging a customer incident, and procuring a new product, among others. Multi-process workflows are particularly complex at least in part because responsibilities can be spread across different departments and divisions and require the coordination of all involved parties. As described herein, the disclosed techniques include the ability to easily create and easily visualize the multi-process workflow without requiring the programming knowledge typically required to build a software application. The techniques allow a person with only a limited knowledge of the digital platform to create a digital and automated version of a workflow, including the ability to combine processes that interact with different parties.

In various embodiments, the disclosed techniques address the technical challenge of digitizing and automating multi-process workflows. Non-technical users are able to easily create and visualize a multi-process workflow including the many activities that make up each process. Little if any programming ability is required to create a corresponding application that can be hosted as a software-as-a service application such as a web service and accessed by users via a web browser. In some embodiments, the user interface for a multi-process workflow design tool includes a different lane or workflow item grouping container for each process of a multi-process workflow. For example, the steps of the first process of the multi-process workflow are contained within a first workflow item grouping container. The steps of the second process of the multi-process workflow are contained within a second workflow item grouping container. The steps of the third process of the multi-process workflow are contained within a third workflow item grouping container, and so forth. A user can add or remove workflow item grouping containers as needed to add or remove processes to and from the workflow. Complex multi-process workflows can contain four, five, or more workflow item grouping containers. In various embodiments, the workflow item grouping containers and their respective workflow items can also be reordered, for example, by dragging and dropping a container, using a visual user interface. Similarly, the individual workflow items within each container can be reordered, for example, by dragging and dropping an item, using a visual user interface. The workflow item grouping containers can also be configured by manipulating the user interface components representing each workflow item grouping container. In various embodiments, the workflow items of each workflow item grouping container are the different activities (such as steps or tasks) that make up the process represented by the workflow item grouping container.

In some embodiments, each workflow item grouping container has its own execution condition. The configured execution condition controls the execution of the workflow item grouping container such as when and under what conditions the workflow item grouping container should execute. For example, by configuring execution conditions, different workflow item grouping containers can run sequentially or in parallel allowing different processes of the multi-process workflow to proceed sequentially or in parallel. Other settings can be configured as well. For example, the workflow items of a workflow item grouping container can be configured to execute only when certain conditions are met, such as only after a particular start delay elapses and/or after a dependency or condition is met. In some embodiments, execution conditions include one or more action plans. Action plans can be created to configure a start plan, an end plan, and a restart plan. In some embodiments, each plan can have a different start condition. The different configuration operations are modifiable via the provided user interface.

In some embodiments, the user interface includes user interface components displaying the workflow items of each workflow item grouping container. For example, each workflow item corresponds to a different activity of a process and is displayed as its own user interface component with its own configurable specification. As an example of the activities of a single process of a multi-process workflow, a first workflow item of a workflow item grouping container can correspond to sending an initial email communication, a second workflow item of the workflow item grouping container can correspond to creating a shared online chat channel, and a third workflow item of the workflow item grouping container can correspond to starting a conference call. Other example workflow items can include performing different tasks such as running a script, sending notifications, and requesting approvals, among others. Each workflow item belongs to the workflow item grouping container and is also individually configurable. For example, in some embodiments, each workflow item has an individually configurable execution condition. A workflow item can be configured to execute immediately, after a previous activity, with a previous activity, or using another appropriate configuration option. In various embodiments, the configuration settings are visually displayed along with the user interface component of the workflow item and can be modified via the provided user interface. The provided user interface allows both configuration of a workflow at the workflow item level of granularity as well as at the workflow item grouping container level of granularity. In various embodiments, modifications to the workflow item grouping container apply to the set of workflow items belonging to the container, while modifications to each workflow item apply only to the workflow item itself.

In some embodiments, a workflow design tool includes a user interface for easily visualizing and modifying the creation of multi-process workflow solutions. Each process of a multi-process workflow can be represented as a group of workflow items and can correspond to a different workflow item grouping container (or lane). In some embodiments, an identification of a first workflow item grouping container is received. The first workflow item grouping container is a part of a collection of workflow item grouping containers organizing an end-to-end multi-process workflow solution. The first workflow item grouping container corresponds to a single process of a multi-process workflow and is displayed as a user interface component as part of the workflow design tool. The first workflow item grouping container can contain the activities associated with a first process of a multi-process workflow solution. In some embodiments, an identification of a second workflow item grouping container is received, wherein the second workflow item grouping container is a part of the collection of workflow item grouping containers of the end-to-end multi-process workflow solution. For example, a second workflow item grouping container corresponds to another single process of the multi-process workflow and is also displayed as a separate user interface component as part of the workflow design tool. The second workflow item grouping container can contain the activities associated with a second process of the multi-process workflow.

In some embodiments, an execution condition of the first workflow item grouping container is received and an execution condition of the second workflow item grouping container is received. For example, each workflow item grouping container has its own execution condition. An execution condition can specify the conditions under which the workflow items of a workflow item grouping container are executed. For example, an execution condition can include a start condition setting, such as specifying that the workflow item grouping container should start immediately, with a previous workflow item grouping container, after a previous workflow item grouping container, with a dependent condition, and after a dependent condition, among other appropriate configurations. For example, a workflow item group can be configured to start when a previous workflow item in another workflow item group starts or when a previous workflow item in another workflow item group finishes. With respect to dependent conditions, a workflow item group can be configured to start when a dependent task starts or when a dependent task finishes. In some embodiments, starts can be configured with a delay and/or based on a condition. For example, a fixed time delay can be configured as part of an execution condition. As another example, a workflow item group can be configured to only start after a condition is met. The condition may be based on a trigger record, another previous activity's output, or another configured condition.

In some embodiments, a specification of one or more workflow items belonging to the first workflow item grouping container is received. Each workflow item belonging to the first workflow item grouping container has an individually configurable execution condition and corresponds to a different individual activity of the end-to-end multi-process workflow solution. Similarly, a specification of one or more workflow items belonging to the second workflow item grouping container is received. Each workflow item belonging to the second workflow item grouping container has an individually configurable execution condition and corresponds to a different individual activity of the end-to-end multi-process workflow solution. In various embodiments, each workflow item belonging to a workflow item grouping container has its own individually configurable execution condition. For example, an activity associated with a workflow item can be configured with an execution condition specifying a start condition setting. Examples of different start condition settings can include a configuration to start an activity immediately, to start an activity with a previous activity, to start an activity after a previous activity, to start an activity based on a dependency, and to start an activity after a dependency has been met, among others. In various embodiments, each workflow item is displayed as a user interface component associated with its workflow item grouping container. Once the multi-process workflow is diagramed using the workflow design tool, an application implementing the workflow can be generated. For example, a web service application can be generated and hosted as a software-as-a-service application. In various embodiments, the user interface of the workflow design tool may be rendered as part of a web service to a user via a web browser or another appropriate application. Similarly, the generated web service can be accessed via a web browser or another appropriate application.

In some embodiments, a user modifiable user interface representation of a first workflow item grouping container is provided. The first workflow item grouping container is a part of a collection of workflow item grouping containers organizing a design of an end-to-end multi-process workflow solution. Similarly, a user modifiable user interface representation of a second workflow item grouping container is provided. The second workflow item grouping container is a part of the collection of workflow item grouping containers organizing the design of the end-to-end multi-process workflow solution. The user interface representations of the first and second workflow item grouping containers allow a user to modify the execution conditions, ordering, or other properties of the respective containers and their corresponding workflow items. Each workflow item of each workflow item grouping container is similarly modifiable via an interactive user interface representation. In various embodiments, an interactive user interface representation of a first workflow item belonging to the first workflow item grouping container is provided. The first workflow item corresponds to a different individual activity of the end-to-end multi-process workflow solution and a user is able to interact with the interactive user interface representation of the first workflow item to modify a workflow property of the first workflow item. For example, a user can modify the start and/or execution condition of each workflow item using the item's interactive user interface representation. In various embodiments, an interactive user interface representation of a second workflow item belonging to the second workflow item grouping container is provided. The second workflow item corresponds to a different individual activity of the end-to-end multi-process workflow solution and the user is able to interact with the interactive user interface representation of the second workflow item to modify a workflow property of the second workflow item. For example, a user can modify the start and/or execution condition of the second workflow item using the second workflow item's interactive user interface representation without modifying the properties of the first workflow item.

FIG. 1 is a block diagram illustrating an example of a network environment for creating and utilizing a multi-process workflow solution. In the example shown, clients 101, 103, and 105 access services on application server 121 via network 111. The services can include both an automation designer tool for creating multi-process workflows as well as the application generated for implementing the designed multi-process workflow solution. Network 111 can be a public or private network. In some embodiments, network 111 is a public network such as the Internet. In various embodiments, clients 101, 103, and 105 are network clients such as web browsers for accessing web services. Application server 121 provides web services including web applications. Application server 121 may utilize database 123 to provide certain services and/or for storing data associated with the automation designer tool. For example, database 123 can be a configuration management database (CMDB) used by application server 121 for providing CMDB services related to multi-process workflow solutions. Among other information, database 123 can store configuration information related to managed assets, such as related hardware and/or software configurations. Database 123 can also be used to store information related to process configurations and process activities of multi-process workflows.

In some embodiments, each of clients 101, 103, and 105 can access application server 121 to create a custom workflow involving multiple processes. The application server supplies to a client, such as clients 101, 103, and 105, an interactive visual design tool. Utilizing the visual design tool, a multi-process workflow can be designed by a user and a corresponding application is created. The visual design tool allows a user to create the digitalized workflow without requiring the user to write any software or programming code. In some embodiments, the application generated from the visual design tool is a web service hosted on application server 121. Users can access the created application via clients such as clients 101, 103, and 105. In some embodiments, each of clients 101, 103, and 105 can be a network client running on one of many different computing devices, including laptops, desktops, mobile devices, tablets, kiosks, smart televisions, etc.

Although single instances of some components have been shown to simplify the diagram, additional instances of any of the components shown in FIG. 1 may exist. For example, application server 121 may include one or more servers. Similarly, database 123 may not be directly connected to application server 121 and/or may be replicated or distributed across multiple components. As another example, clients 101, 103, and 105 are just a few examples of potential clients to application server 121. Fewer or more clients can connect to application server 121. In some embodiments, components not shown in FIG. 1 may also exist.

Figure 2:
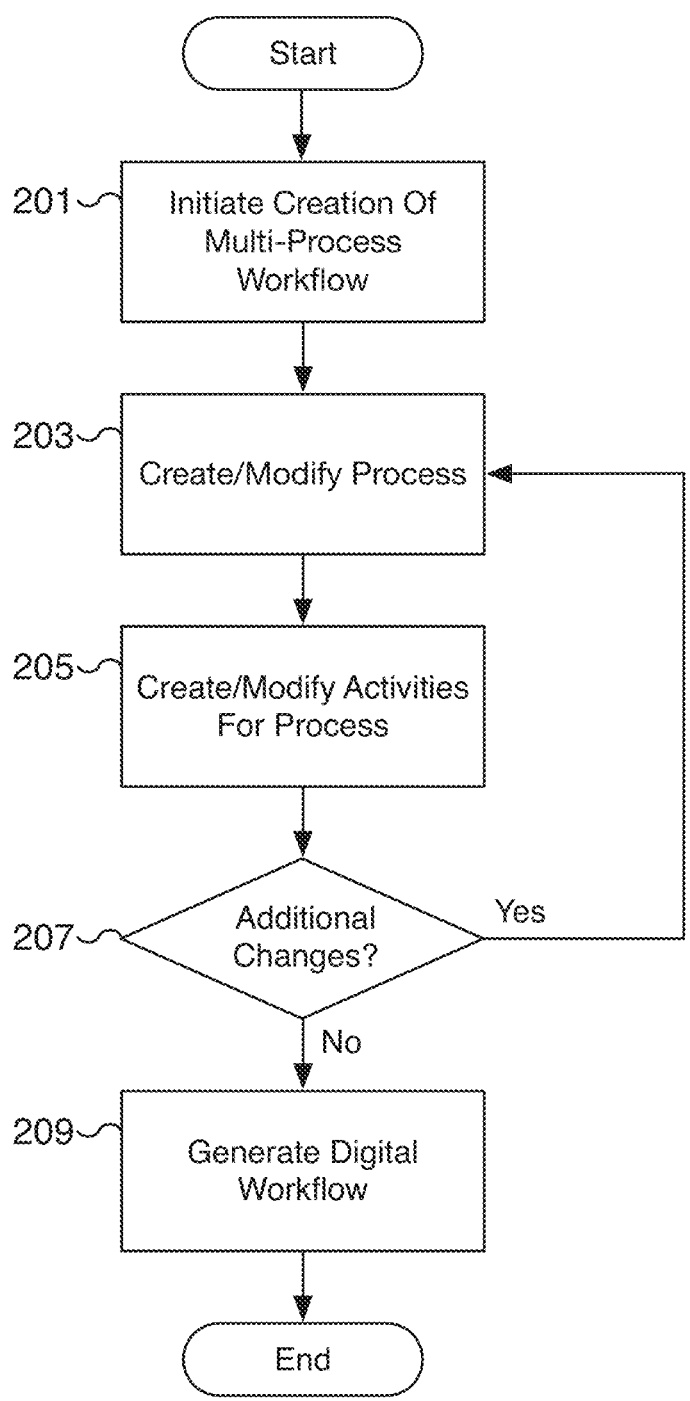
FIG. 2 is a flow chart illustrating an embodiment of a process for creating a digital multi-process workflow solution.

FIG. 2 is a flow chart illustrating an embodiment of a process for creating a digital multi-process workflow solution. In the example shown, the workflow is created using an interactive and visual design tool. The created workflow is at least in part automated via a generated computer application that can be accessed via a digital device such as a web browser. Using the process of FIG. 2, a multi-process workflow is easily digitized and can bridge processes that require coordination from multiple parties. In some embodiments, the process of FIG. 2 is run on an application server such as application server 121 of FIG. 1. The application server may utilize and/or store workflow data in a database such as database 123 of FIG. 1. In some embodiments, the design tool is accessed from a client such as client 101, 103, and/or 105 of FIG. 1. Moreover, once the design is complete, the application generated that implements the workflow can be hosted on an application server such as application server 121 of FIG. 1 and can be accessed by clients such as client 101, 103, and/or 105 of FIG. 1.

In various embodiments, the process of FIG. 2 is used to digitize a multi-process workflow. For example, the onboarding of a new hire can be implemented as a multi-process workflow solution. The workflow can include a first process for coordinating with a new manager, a second process for coordinating with a human resources department, and a third process for coordinating with an information technology department. Additional, fewer, or different processes may be needed in some scenarios. Using the process of FIG. 2, each process of the multi-process workflow solution is created and activities that make up each process are added and configured. Using the previous example, the first process of coordinating with a human resources department may require three different activities. The activities can include tasks such as emailing the human resources contact, enrolling the new employee into a human resources orientation meeting, and completing a human resources questionnaire. Each activity is a workflow item and belongs to a workflow item grouping container describing the first process. In various embodiments, each workflow item grouping container and associated workflow items are visually displayed via a user interface. New processes can be added and existing processes can be modified (including being removed). Similarly, new activities can be added to a process and existing activities can be modified (including being removed.) Once the multi-process workflow is created using the visual design tool, an automated digital workflow can be generated as an application service.

As another example, a user can visually create a digitized version of a multi-process manufacturing workflow. Using the process of FIG. 2 and the techniques disclosed herein, the workflow can be automated using a computer application generated by the workflow design tool. A sample manufacturing workflow can include multiple processes such welcome & setup, feasibility, provisioning, installation, and billing activation processes. Each of the processes can include multiple activities. For example, the welcome & setup process can include the activities: send welcome e-mail to primary customer contact, provide login instructions and setup guide, and set up customer contacts. The feasibility process can include the activities: coordinate schedule with customer/vendor, dispatch site inspection, perform site inspection, complete inspection, coordinate schedule with customer/vendor, dispatch for site re-check, and perform site re-check. The provisioning process can include the activities: get permits and coordinate with vendors/suppliers. The installation process can include the activities: plan for installation, coordinate schedule with customer, dispatch crew for installation, and perform installation. The billing activation process can include the activities: get customer signature, update warranty, and initiate billing. Each of the processes and/or activities can be assigned to a different responsible party. The workflow design tool allows a user to visually bring together disparate tasks into a common unified multi-process workflow and to generate a digital and automated computer application process to implement the workflow solution.

At 201, the creation of a multi-process workflow is initiated. For example, using the visual design tool, a new multi-process workflow is created or an existing multi-process workflow is loaded. In some embodiments, the created multi-process workflow is based on an existing workflow or a workflow template. In various embodiments, each multi-process workflow corresponds to one or more database records. For example, a database record for each workflow is created to store the information of that particular workflow. The record can be used to preserve the workflow across user sessions and to generate an application program. In various embodiments, a workflow item grouping container is associated with each process of the multi-process workflow.

At 203, one of the processes of the multi-process workflow is created and/or modified. Using the visual design tool, a process of a multi-process workflow is added or modified. The process can be one of many processes of the workflow. Each process is associated with a workflow item grouping container used to contain the associated activities (or workflow items) of the process. In some embodiments, each workflow item grouping container is displayed as a visual process lane. In various embodiments, each process can have its own configurable execution condition. At 203, one of the processes can be configured. For example, the execution condition of a process is modified. In some embodiments, configuring the execution condition includes configuring a start condition. Example start conditions can include starting the process immediately, starting the process along with a previous process, starting the process after a previous process, starting the process with a configured dependency (such as when a dependent task starts), and starting the process after a configured dependency is met (such as when a dependent task finishes). Other start conditions may be appropriate as well. In various embodiments, a visual user interface allows a user to easily configure the conditions. As another example, a delay can be configured such that the process only begins after a delay is passed. For example, a process can be delayed by a time value such as 5 seconds, 5 minutes, 1 day, 1 week, or another appropriate time. As another example, a process can be delayed to start only after a dependency is satisfied. In some embodiments, an execution condition can be configured that is independent of when the process starts. For example, a condition can be configured to control whether a process lane is active and if it should be skipped.

In some embodiments, at 203, an action plan for a process can also be configured. For example, each process can have one or more actions plans. A different action plan can be configured for the start of a process, the end of a process, and the restart of a process. In some embodiments, start, end, and restart actions plans, respectively, can be configured or modified for each process. Moreover, in some embodiments, start conditions can be individually configured for each action plan. For example, on a restart, the associated action plan can configure the process to restart immediately, with a previous event, after a previous event, with a dependent event, or after a dependent event.

In some embodiments, a process can be configured with compliance rules. For example, a process (or an activity of the process) can be configured with one or more assertion rules. An assertion rule can be conditional rule to determine whether the process (or an activity of the process) passes or fails an audit assertion condition. The output of the compliance rules, for example, when the workflow is executed, can be directed to a compliance log or report. In some embodiments, the compliance rules are used to generate a compliance report.

At 205, activities of one of the processes of the multi-process workflow are created and/or modified. For example, the activities that belong to each process can be created and/or modified. A new activity can be added to the process and existing activities can be modified. In various embodiments, each activity is a workflow item that belongs to a workflow item grouping container representing the process. An activity can have its own individually configurable execution condition. For example, at 205, an activity can be modified to configure its execution condition. Similar to a process, the configuration can control different parameters of the execution of the activity. As one example, each workflow item can have a start condition that can be configured to control the start of the activity. Example start condition settings can include starting the activity immediately, starting the activity with a previous activity, starting the activity after a previous activity finishes, starting the activity with a dependency, and starting the activity after a dependency is complete, among others. Additional or fewer start conditions may be appropriate as well. For example, in some embodiments, a start condition can include a configurable delay or condition requirement. In some embodiments, an execution condition can be configured that is independent of when the activity starts. For example, a condition can be configured to control whether a process lane is active and/or visible and if it should be skipped or displayed, respectively.

At 207, a determination is made whether there are additional changes to the workflow. In the event there are additional changes, processing continues back to step 203 where a process of the workflow can be created and/or modified. In some embodiments, the processing continues back to step 205 (not shown) to modify one or more activities of the workflow instead of a process of the workflow. In the event there are no additional changes, processing continues to step 209.

At 209, a digital workflow is generated. For example, a computer application corresponding to the configured workflow is generated. In some embodiments, the generated application is a web service that is hosted on an application server and offered to clients as a software-as-a-service. For example, a user can access the generated digital workflow via a web browser or similar client application. In some embodiments, as part of the generated computer application, the digital workflow generates reports and analytics. For example, case and activity details along with other analytics can be outputted using a reporting function of the application. The report can take the form of a web page, an email, a log file, or another appropriate format.

Figure 3:
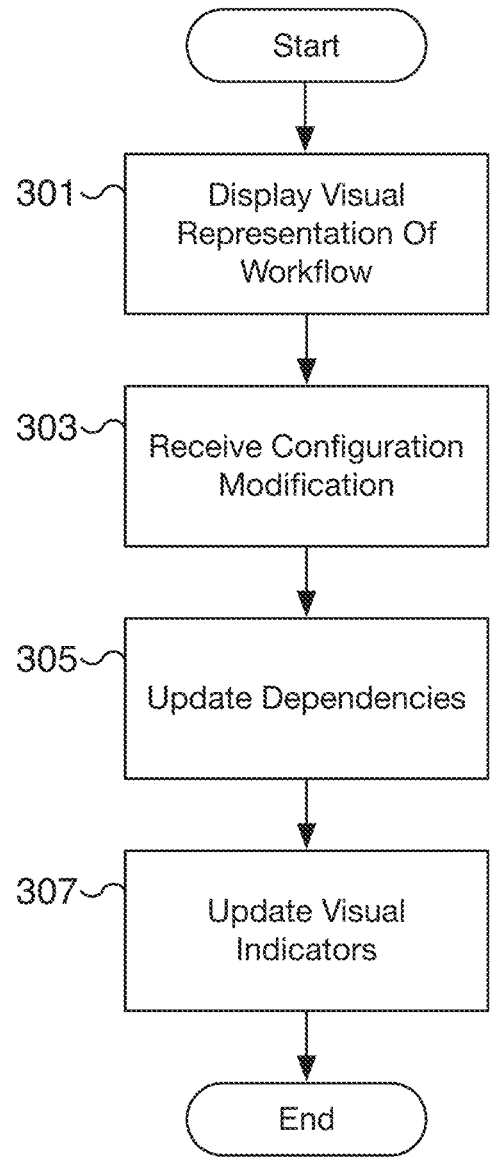
FIG. 3 is a flow chart illustrating an embodiment of a workflow design tool process.

FIG. 3 is a flow chart illustrating an embodiment of a workflow design tool process. In the example shown, a workflow design tool presents a visual representation of a multi-process workflow to a user and allows a user to create and modify the workflow. In some embodiments, each process of the workflow is displayed as a process lane and each lane includes the different activities associated with the process. Visual indicators display configurations of the different workflow components and user interface components allow the different workflow components to be configured. In some embodiments, a user interface component may initiate another user interface component for more advanced configuration options. In some embodiments, the process of FIG. 3 is performed as part of the process of FIG. 2. For example, the process of FIG. 3 can be performed at 203, 205, and/or 207 of FIG. 2. In some embodiments, the process of FIG. 3 is run on an application server such as application server 121 of FIG. 1 from a client such as client 101, 103, and/or 105 of FIG. 1.

At 301, a visual representation of a multi-process workflow is displayed. For example, a user interface displaying a multi-process workflow is rendered via a web browser or similar application. Each process can be displayed as a group of workflow activities or items. In some embodiments, configuration settings of the workflow item groups and associated workflow items are displayed along with the representation of the groups and items. For example, a start condition can be displayed as part of a user interface component of a workflow item group. As another example, a user interface indication associated with a workflow item group can be displayed to identify whether the associated process should run in parallel or sequentially with another process.

In some embodiments, the displayed activities of each process can be controlled independently. For example, the user can scroll each workflow item group independently. Similarly, in the event there are too many workflow item groups to all be displayed, a subset is displayed and a user can scroll among the workflow item groups to determine which ones are displayed. For example, a user can scroll left to right to display a different set of workflow item groups.

At 303, a configuration modification is received. For example, the user modifies the configuration of one or more portions of the workflow. In various embodiments, the modifications can be initiated via a user interface device such as a mouse, trackpad, touchscreen, keyboard, or another appropriate device. In some embodiments, activities and groups of activities can be reordered, added, and/or removed. For example, an activity can be dragged and dropped ahead of or behind another activity to reorder the respective activities or move an activity from one process to another. Similarly, a group or lane of activities can be dragged and dropped to reorder the respective processes. In some embodiments, execution conditions such as start settings are configured. As another example, advanced or overflow configuration settings can be modified by accessing advanced configuration user interface components.

At 305, dependencies are updated. For example, some activities receive as input the output of another activity. Similarly, an output of one activity can be used as an input to a subsequent activity. At 305, the dependencies of the workflow are updated. For example, a selection window for an input associated with an activity can navigate the available outputs of previous activities based on the updated dependencies. In various embodiments, the dependencies are updated at least in part to allow different user interface components to dynamically display available reference data for an activity, such as available reference values that can be used as an input. Updated dependencies also allow data to be correctly passed from one activity to another.

At 307, visual indicators of the multi-process workflow are updated. For example, the workflow is rendered to reflect changes to the configuration from steps 303 and/or 305. In response to step 303, new activities or workflow items may have been added or removed and new processes or workflow item groups may have been added or removed. Similarly, conditions such as execution conditions may have been modified and the visual indicators are updated. For example, two processes are changed from running sequentially to now being configured to run in parallel. The visual indicators corresponding to the operation of the two processes with respect to one another are updated accordingly. In some embodiments, a chevron indicating one process precedes the other may be changed and squared off boarders are rendered to indicate the two processes are to be run in parallel.

Figure 4:
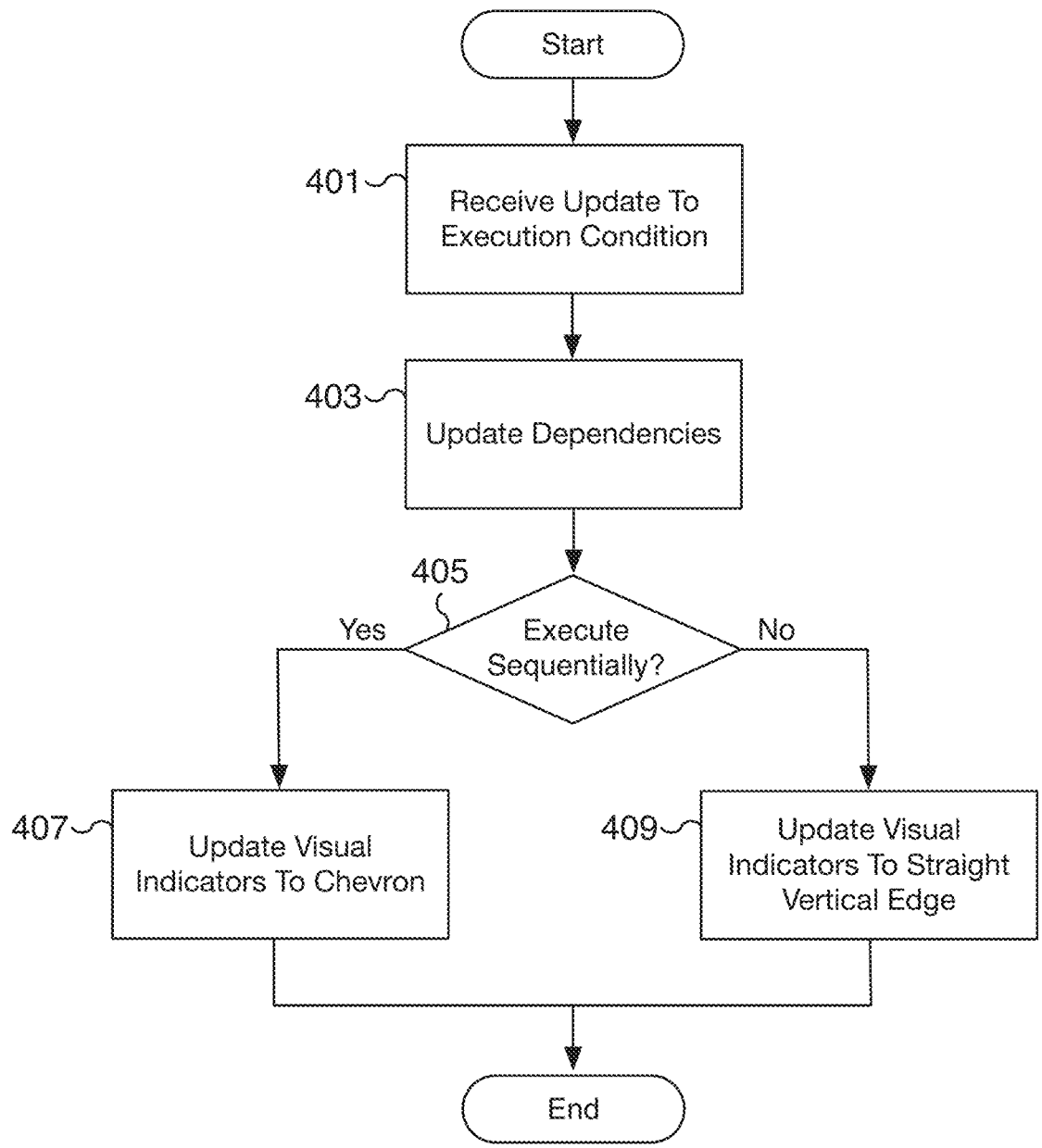
FIG. 4 is a flow chart illustrating an embodiment of a process for modifying the execution condition of a process of a multi-process workflow solution using a workflow design tool.

FIG. 4 is a flow chart illustrating an embodiment of a process for modifying the execution condition of a process of a multi-process workflow solution using a workflow design tool. In the example shown, a workflow design tool updates the visual representation of a multi-process workflow solution in response to configuration modifications to one of the processes of the workflow. Each process of the multi-process workflow can have its own execution condition. The rendered visual interface of the workflow reflects at least some of the execution condition settings. For example, a user can quickly glance at the user interface and understand the key settings for how the processes of the workflow are configured. In some embodiments, the process of FIG. 4 is performed as part of the process of FIG. 2 and/or as part of the process of FIG. 3. For example, the process of FIG. 4 can be performed at 303, 305, and/or 307 of FIG. 3. In some embodiments, the process of FIG. 4 is run on an application server such as application server 121 of FIG. 1 from a client such as client 101, 103, and/or 105 of FIG. 1. In various embodiments, the processes of the workflow are each represented as a workflow item grouping container and the activities of each process are each represented as a workflow item.

At 401, an update to an execution condition is received. For example, a user performs a user event to modify the execution condition configuration of a process. For example, the user can update an execution condition such that a process runs in parallel with another process or runs sequentially with another process. The user can configure when a process starts, such as immediately, scheduled, or another appropriate configuration. In some embodiments, the user configures start settings with associated logic. For example, a process can be configured to start manually, immediately, after a previous process, or with a previous process. As another example, a process can start after specific logic such as conditions are met and/or with a start delay.

In some embodiments, the user can configure one or more action plans such as a start, end, and/or restart action plan for the process. With certain user interface embodiments, the user can also modify metadata for a process. For example, a user can modify the name, description, order, and/or active (or inactive) state of a process. In some embodiments, the user can modify a visibility setting of the process to control whether the process and/or its respective data such as inputs are visible when run. As another example, in some embodiments, each process has a run-time state, such as started, not started, completed, or skipped, as examples. The run-time state can be configured to be displayed along with the process when the workflow is running. For example, the run-time state can be color coded and a different color can be displayed along with the process when the workflow is executed. A started process can be colored green and a not started process can be colored red.

At 403, dependencies are updated. For example, the availability of data that can be passed between activities is updated. In various embodiments, the dependencies are updated based on the relationship between the activities and processes. For example, a change in the execution order of activities and/or processes can result in the output of one activity being made available as an input to another activity. In various embodiments, updated dependencies allow data to be correctly passed from one activity to another.

At 405, a determination is made for each process pair whether to execute the processes sequentially. In the event the pair is configured to run sequentially with one another, processing proceeds to 407 to update the corresponding execution of visual indicators to a chevron. In the event the pair is configured to not run sequentially with one another, processing proceeds to 409 to update the corresponding execution of visual indicators to straight vertical edges. In various embodiments, the appropriate visual indicators impact the boundary of the user interface components between the process pairs.

At 407, the visual indicators for a process pair are updated to include a chevron. For example, a visual indicator of the first running process of the process pair is modified to include a chevron. The direction of the chevron points to the second running process of the process pair. In some embodiments, the visual indicator of the second running process is changed to indicate that it is the target of the chevron of the first running process. For example, the boundary of the user interface component of the second running process can be changed to an indented portion to match the chevron and is the target of the chevron.

At 409, the visual indicators for a process pair are updated to include straight vertical edges. For example, the boundary of the user interface components of the process pair are updated to be squared off or straight vertical edges. The two parallel edges bordering each process indicate to a user that neither of the processes precedes the other in execution order. In some embodiments, a process can have one boundary that is a straight vertical edge and another that is a chevron. This indicates that the process runs in parallel with one process but also precedes another process.

Figure 5:
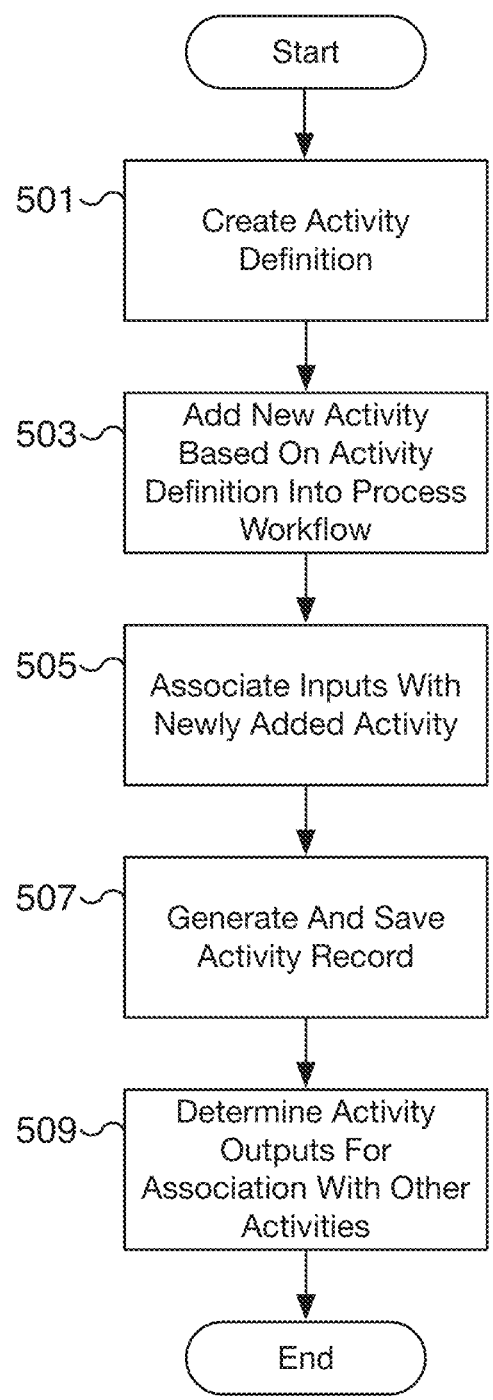
FIG. 5 is a flow chart illustrating an embodiment of a process for adding a new activity to a process of a multi-process workflow solution using a workflow design tool.

FIG. 5 is a flow chart illustrating an embodiment of a process for adding a new activity to a process of a multi-process workflow solution using a workflow design tool. In the example shown, a workflow design tool is used to add a new activity or workflow item to a process or workflow item group. In some embodiments, the new activity is rendered as part of a process lane and is differentiated from other activities of the process and other activities of other process lanes. In some embodiments, the process of FIG. 5 is performed as part of the process of FIG. 2 and/or as part of the process of FIG. 3. For example, at least part of the process of FIG. 5 can be performed at 205 of FIG. 2. In some embodiments, the process of FIG. 5 is run on an application server such as application server 121 of FIG. 1 from a client such as client 101, 103, and/or 105 of FIG. 1. In some embodiments, the information associated with the newly added activity is stored in a database such as database 123 of FIG. 1.

At 501, an activity definition is created. For example, an activity author creates an activity definition specifying activity properties such as an activity type and flow. The activity definition can be stored in a database such as database 123 of FIG. 1 and can be retrieved and used as a template for creating a new activity. In various embodiments, an activity author can be a different user from the one creating the multi-process workflow solution. In some embodiments, the activity definition is part of a catalog or list of pre-defined activities that can be used to quickly construct a working multi-process workflow solution. For example, pre-defined activities can be created to correspond to a fulfillment request, a notification, an approval, a request to create a catalog, a creation or update of a parent case, a creation or update of a child case, and running a script, among others.

At 503, a new activity based on the activity definition is added into a process of a multi-process workflow. For example, in some embodiments, a user creating the workflow selects the activity definition from an activity selection user interface component to add the new activity to a particular process of the workflow. For example, a user adds a notification activity to a process for informing a hiring manager that a new hire has completed their orientation.

At 505, inputs are associated with the newly added process activity. For example, the user can proceed to configure or customize the newly added activity. In some embodiments, an activity accepts inputs and the user will associate data with the input of the newly added activity. The associated input can be the output of a previous activity, or from the record that initiated the process (the trigger record). For example, an input of the newly added email notification process activity can be the email address output of a previous new hire activity that was set up earlier in the process.

At 507, an activity record is generated and saved. For example, a database record is generated to reflect the settings of the activity. In some embodiments, the activity record is stored in a database such as database 123 of FIG. 1. For example, a generated activity record corresponding to a process activity is stored in an activity table of a database. The activity record can include the linked outputs of other activities as inputs.

At 509, outputs of the activity are determined for association with other activities of the multi-process workflow. For example, in some embodiments, the dependencies of the workflow are updated to allow the output of the newly added activity to be used as an input to a subsequent activity. In various embodiments, the outputs of the newly added activity are determined and made available as inputs to other activities of the workflow that come after the activity. For example, an activity for an IT department to create a new email address can make the newly created email address available to other activities as an input. The other activities can be associated with other departments such as sending a calendar invite to a new hire's email address for a weekly scheduled internal team meeting.

Figure 6:
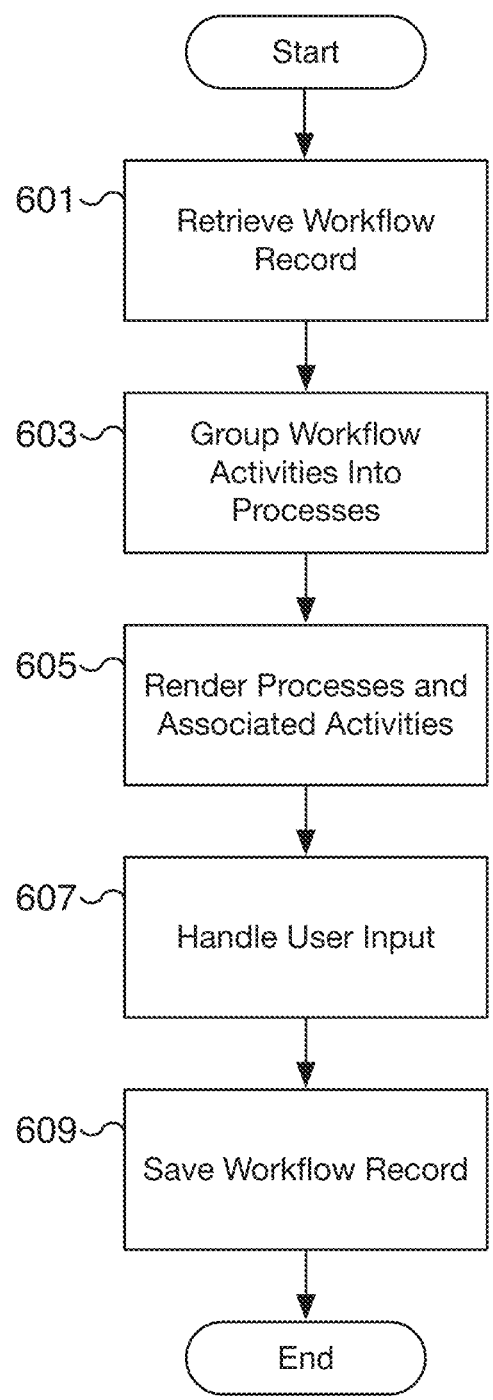
FIG. 6 is a flow chart illustrating an embodiment of a process for adding a new multi-process workflow solution using a workflow design tool.

FIG. 6 is a flow chart illustrating an embodiment of a process for adding a new multi-process workflow solution using a workflow design tool. In the example shown, a workflow design tool is used to add a new multi-process workflow solution. In some embodiments, the process of FIG. 6 is performed as part of one or more of the processes of FIGS. 2-5. For example, the process of FIG. 6 is used to save a newly created workflow modified using the processes of FIGS. 2-5. In some embodiments, the process of FIG. 6 is run on an application server such as application server 121 of FIG. 1 from a client such as client 101, 103, and/or 105 of FIG. 1. In some embodiments, the information associated with the new workflow is stored in a database such as database 123 of FIG. 1.

At 601, a record corresponding to a multi-process workflow is retrieved. For example, a user opens a new or existing workflow that results in retrieving a workflow record from a database. The workflow record can reference other records such as activity records of the associated activities utilized in the workflow. At 601, the corresponding activity records can also be retrieved. For example, the corresponding activity records may be stored as references in the retrieved workflow record and are also retrieved from a database. In various embodiments, the database used to keep workflow records is a database such as database 123 of FIG. 1. In some embodiments, a user creates a new workflow at 601 that includes both creating a new workflow record in a database and then effectively retrieving the newly created record. In the event the new workflow record is not stored in the database, it is not retrieved.

At 603, the activities of the multi-process workflow are grouped into processes. For example, the activities associated with a workflow are grouped into individual process groups or workflow item groups. In various embodiments, the workflow record describes the different processes of the workflow and each activity of each process. Each activity can be represented as a workflow item and is associated with the workflow item grouping container of each process. In some embodiments, each process is a process lane that contains ordered activities as workflow items.

At 605, processes and their associated activities of the multi-process workflow are rendered. For example, each activity is associated with a workflow item and belongs to a workflow item grouping container of the activity's process. The different workflow item grouping containers of the workflow and the associated workflow items are displayed to the user. In some embodiments, all the processes can be displayed. In the event there are too many to display, a subset of workflow item grouping containers is displayed and the user can navigate through the different processes of the workflow to determine which ones to display. For example, in some embodiments, a user can navigate by scrolling left or right to show different process lanes. In some embodiments, the different processes and associated activities are rendered to a display along with visual indictors of at least some of the configuration settings. For example, the most important settings can be displayed as part of the rendered user interface components.

At 607, user input is handled. For example, a user modifies the workflow by making changes such as changes to the processes and activities of the workflow. New processes and activities can be added. Processes and activities can also be modified and/or deleted. Drag and drop user input operations on process and activity user interface components can be handled, for example, to reorder the appropriate processes or activities. In some embodiments, activity cards can be dragged within a process lane or across process lanes. Overflow user interface windows can be displayed to allow a user to modify additional configuration settings not accessible in the main user interface. In some embodiments, the user can provide input to configure the workflow parameters such as execution conditions. In various embodiments, in response to the user input, the displayed visual representation of the workflow is updated. For example, two process lanes can be reordered after the user input to reorder the processes is handled. In various embodiments, user input is handled using the processes of FIGS. 2-5. For example, at steps 203 and 205 of FIG. 2, user input is handled to create and/or modify a process and activities, respectively. As another example, at step 303 of FIG. 3, user input for modifying a configuration is handled.

In some embodiments, at 607, a user can launch a testing procedure. For example, a user can launch a testing procedure to test a process and/or activity of a process. In some embodiments, a process of a workflow can be started in a test mode. The process starts from a designated start point. This functionality is beneficial to test a process (or activity) outside of the context of the entire workflow. In some embodiments, the test process can be invoked to start the process from a specified activity of the process. For example, instead of starting the test process with the first activity of the process, the testing can be started from the middle of the process or another designated start point. In various embodiments, the testing of the process can populate data such as using data from previous steps for the test.

At 609, a record corresponding to the multi-process workflow is saved. For example, a database workflow record of the workflow is saved to reflect the changes to the workflow. In some embodiments, the workflow record is stored in a database such as database 123 of FIG. 1. For example, a workflow record corresponding to the settings of the workflow is stored in a workflow table of a database. The workflow record can reference the activity records associated with the activities of the workflow.

Figure 7:
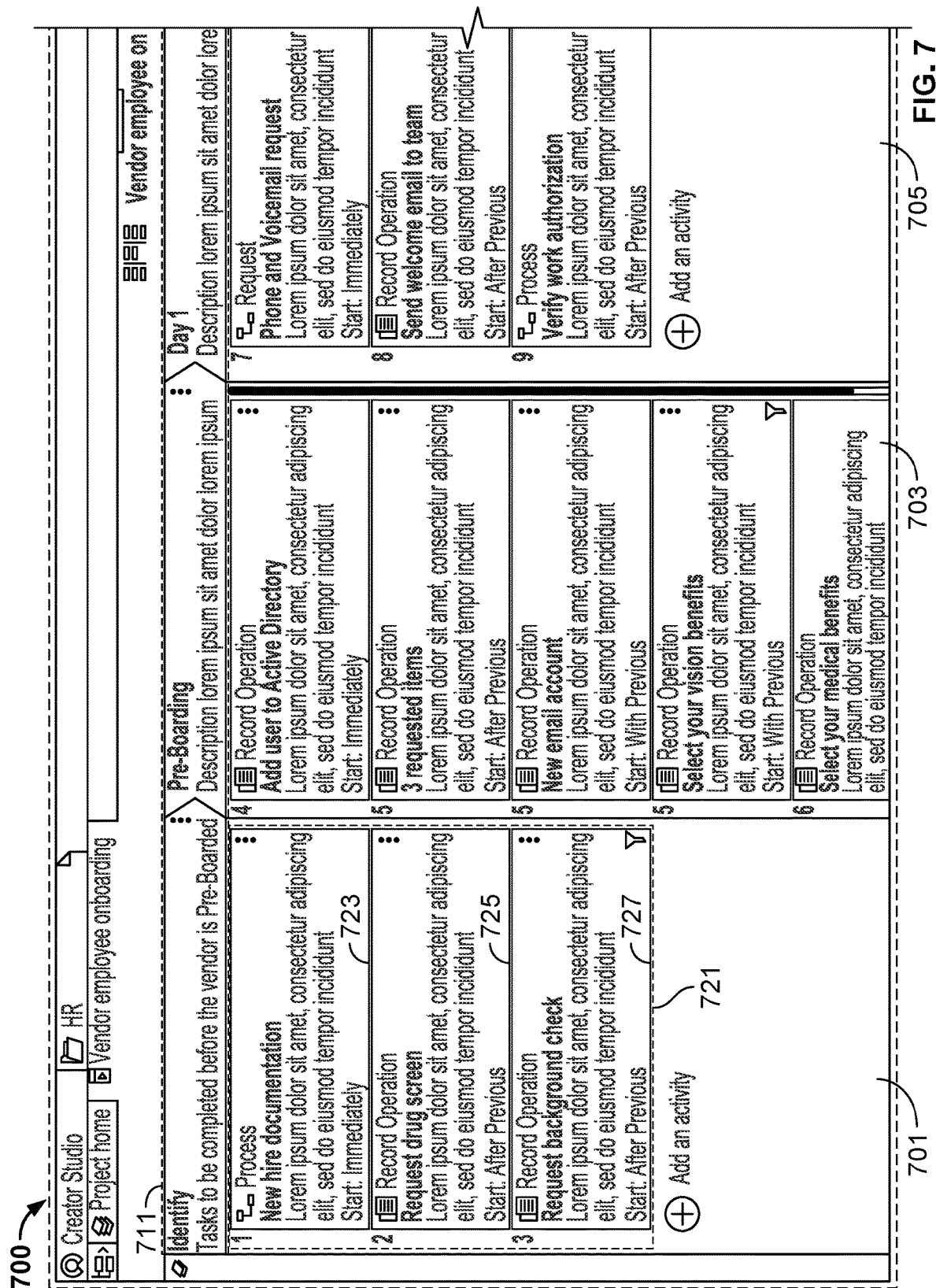
FIG. 7 is a diagram illustrating an example user interface of a workflow design tool.
Figure 7:
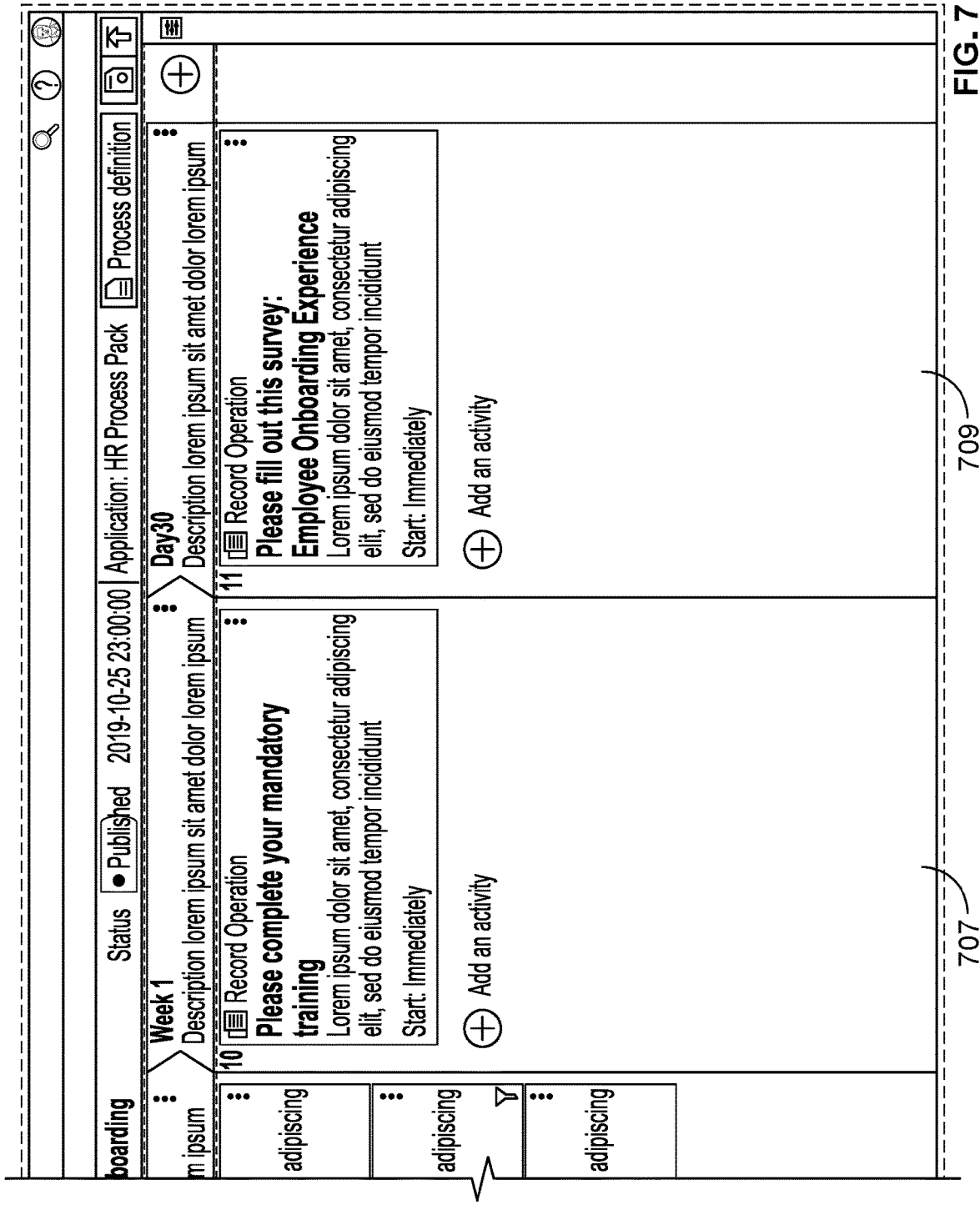

FIG. 7 is a diagram illustrating an example user interface of a workflow design tool. In the example shown, user interface 700 is the user interface for a workflow design tool to visually create digital multi-process workflows. An automated application is generated based on the created workflows. For example, the generated application can be hosted as a web service and be used to automate a digital workflow. User interface 700 is rendered in a client application such as a web browser. In some embodiments, the user interface of FIG. 7 is implemented at least in part by an application server such as application server 121 of FIG. 1 via a client such as client 101, 103, and/or 105 of FIG. 1. In various embodiments, user interface 700 is created at least in part by utilizing the processes of FIGS. 2-6. In some embodiments, the information associated with user interface 700 is stored in a database such as database 123 of FIG. 1. In some embodiments, a user interacts with user interface 700 at 203 and/or 205 of FIG. 2, at 303 of FIG. 3, at 401 of FIG. 4, at 503 and/or 505 of FIG. 5, and/or at 607 of FIG. 6. Updates to user interface 700 can correspond to at least steps 301 and/or 307 of FIG. 3 and/or 407 and/or 409 of FIG. 4.

In various embodiments, user interface 700 is used to create a multi-process workflow. User interface 700 includes process visual user interface components 711. In the example shown, process visual user interface components 711 include five different process visual indicators, one for each of the five processes of a vendor employee onboarding workflow. The first process visual indicator corresponds to an Identify process, the second process visual indicator corresponds to a Pre-Boarding process, the third process visual indicator corresponds to a Day 1 process, the fourth process visual indicator corresponds to a Week 1 process, and the fifth process visual indicator corresponds to a Day 30 process. The visual indictors each include a description of their respective process and all but the last and fifth indicator include a chevron indicating the sequential execution order of the five processes. Each of the five processes further includes a set of activities. The five processes shown in user interface 700 are presented as process lanes 701, 703, 705, 707, and 709 corresponding to the Identify, Pre-Boarding, Day 1, Week 1, and Day 30 processes, respectively. In some embodiments, each of the process lanes 701, 703, 705, 707, and 709 includes workflow items for each activity of the process and the corresponding process visual user interface component. In some embodiments, each process lane is a workflow item grouping container and the activities are represented as workflow items that belong to the container. In the example shown, process lane 701 includes activity set 721. Activity set 721 includes three activity user interface components, activity cards 723, 725, and 727, that represent the three different activities or workflow items of the Identify process. Each of activity cards 723, 725, and 727 corresponds to a workflow item and describes an activity of the Identify process. For example, activity card 723 corresponds to and depicts a new hire documentation task, activity card 725 corresponds to and depicts a request drug screen task, and activity card 727 corresponds to and depicts a request background check task. Similar to the Identify process, each of the other four processes of the workflow include their own activity cards to represent their own activities.

In various embodiments, an activity card describes an activity that can belong to a process of the workflow. The activity card can include a displayed name and description of the corresponding activity as well as configuration information such as execution condition settings and activity type. For example, an activity card can display that an activity is configured to start immediately or after the previous activity. Examples of activity types include a process activity and a record operation activity. For each process, the activity cards of the process lane are displayed in execution order and numbered according to their relative order in the workflow. For example, activity cards 723, 725, and 727 are displayed in execution order and numbered accordingly. The activity cards of the second process are also numbered and the numbering continues from the numbering of the last activity card of the previous process, activity card 727. For example, the activity cards of the first process are numbered 1-3 and the first activity card of the second process is numbered 4. In some embodiments, the numbering of the activities for a particular process restarts at 1 instead of continuing from the numbering of the previous process. In some embodiments, activities that run in parallel are each given a unique number.

In some embodiments and as in the example shown, additional user interface components are depicted but not labeled. For example, "Add an activity" buttons are included under the last of each activity of a process and allow a user to add a new activity to the corresponding process. Similarly, an add process button depicted as a large plus to the right of process visual user interface components 711 allows a user to add a new process. Using user interface 700, a user can easily navigate and visualize the multi-process workflow. For example, a user can scroll within a process (e.g., up and down within a process lane) to view and modify the activities of a process. Similarly, a user can scroll within the workflow (e.g., left and right) to view the processes of the workflow.

Figure 8:
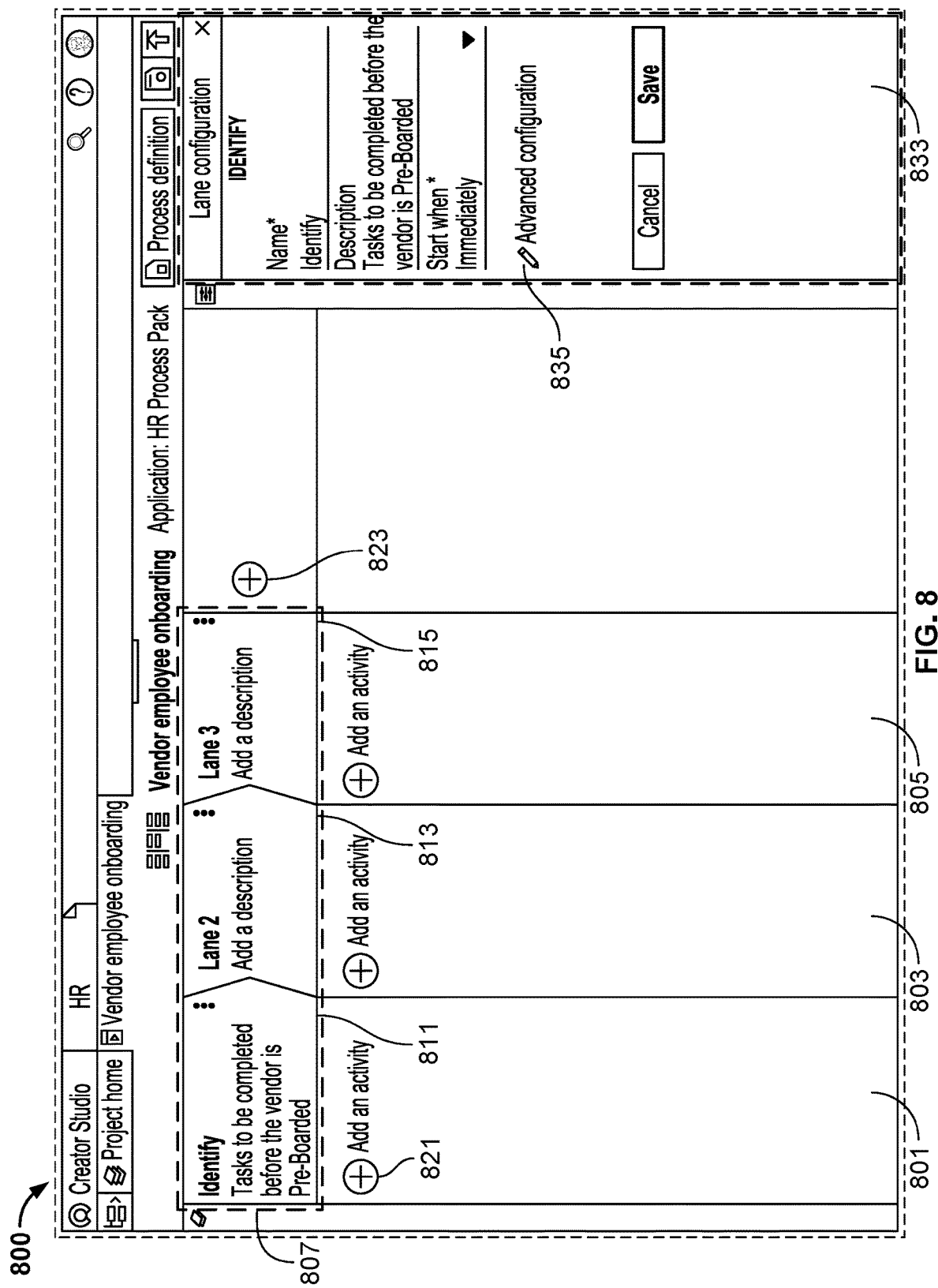
FIG. 8 is a diagram illustrating an example user interface of a workflow design tool.

FIG. 8 is a diagram illustrating an example user interface of a workflow design tool. In the example shown, user interface 800 is the user interface for a workflow design tool to visually create digital multi-process workflows. User interface 800 displays three process lanes 801, 803, and 805. Process lanes 801, 803, and 805 have no activities. In some embodiments, user interface 800 reflects a new workflow with three processes and only minor modifications to the first process such as naming the process and adding a description and start setting. Additional processes can be added to the workflow and activities can be added to implement the respective processes. In some embodiments, a multi-process workflow such as the one displayed in user interface 700 of FIG. 7 is created from the workflow shown in user interface 800. In various embodiments, user interface 800 is created at least in part by utilizing the processes of FIGS. 2-6. In some embodiments, the user interface of FIG. 8 is implemented at least in part by an application server such as application server 121 of FIG. 1 via a client such as client 101, 103, and/or 105 of FIG. 1. In some embodiments, a user interacts with user interface 800 at 203 of FIG. 2, at 303 of FIG. 3, at 401 of FIG. 4, at 503 of FIG. 5, and/or at 607 of FIG. 6. Updates to user interface 800 can correspond to at least steps 301 and/or 307 of FIG. 3 and/or at 407 and/or 409 of FIG. 4.

In the example shown, user interface 800 includes process visual user interface components 807. Process visual user interface components 807 includes the individual process visual indicators 811, 813, and 815. Process visual indicators 811, 813, and 815 correspond to process lanes 801, 803, and 805, respectively. For example, process visual indicator 811 is a visual indicator for process lane 801. In various embodiments, process visual indicators display information of the process such as the name of the process, a description of the process, and important execution configuration settings of the process such as a start setting. In some embodiments, when a process lane is selected, the process visual indicator is highlighted. For example, process visual indicator 811 is highlighted since process lane 801 is selected. Process visual indicators 811 and 813 of user interface 800 are depicted as chevrons that point to subsequent process lanes. For example, process visual indicator 811 points to process visual indicator 813 and process visual indicator 813 points to process visual indicator 815. A process lane with a chevron indicates to the user that the process precedes the target process. For example, the process of process lane 801 is run before the process of process lane 803. Similarly, the process of process lane 803 is run before the process of process lane 805. In various embodiments, the subsequent process (or the process that is the target of the chevron) includes a visual indictor that fits the chevron of the preceding process. In FIG. 8, the visual indicator of the target process is the concave left border for process visual indicators 813 and 815. The indented left border indicates that the target process follows a preceding process. In contrast, in some embodiments, a process that is not dependent on another process has a squared off or straight vertical border. For example, process visual indicator 815 has a right border that is squared off or is a straight vertical edge. This indicates the there is no dependent process that follows the process of process lane 805. In various embodiments, process visual indicators can include additional user interface components. For example, process visual indicators 811, 813, and 815 each include a "more" icon depicted as a vertical line of dots that allows the user to modify the associated process. In some embodiments, the more icon opens a lane configuration dialog such as lane configuration dialog 833.

In various embodiments, a process lane can be configured via a lane configuration dialog such as lane configuration dialog 833. In the example shown, process lane 801 is selected and lane configuration dialog 833 displays and allows a user to modify configuration settings for selected process lane 801. As shown, configuration settings include the ability to set the name, description, and start setting of the process. In various embodiments, the start setting allows for different start settings such as immediately, with a previous process, after a previous process, with a dependent setting, and after a dependent setting. Additional settings can be added or existing ones removed as appropriate. In the example shown, process lane 801 is configured to start immediately. Lane configuration dialog 833 also includes advanced configuration selection 835, a cancel button to cancel any changes made, and a save button to save changes. Advanced configuration selection 835 can be selected to access additional configuration settings for the process. In some embodiments, advanced configuration selection 835 reveals advanced configuration user interface 941 of FIG. 9.

In the example shown, user interface 800 includes additional UI components such as add activity buttons and add process button 823. Every process lane of user interface 800 includes an individual add activity button. The add activity buttons, such as add activity button 821, are labeled with the description "Add an activity" and allow the user to add an activity with the associated process lane. For example, add activity button 821 adds a new activity to process lane 801. To add a new process to the workflow, a user utilizes add process button 823. Add process button 823 is depicted as a large plus to the right of process visual user interface components 807. Add process button 823 allows a user to add a new process to the workflow which will be included as a new process lane.

Figure 9:
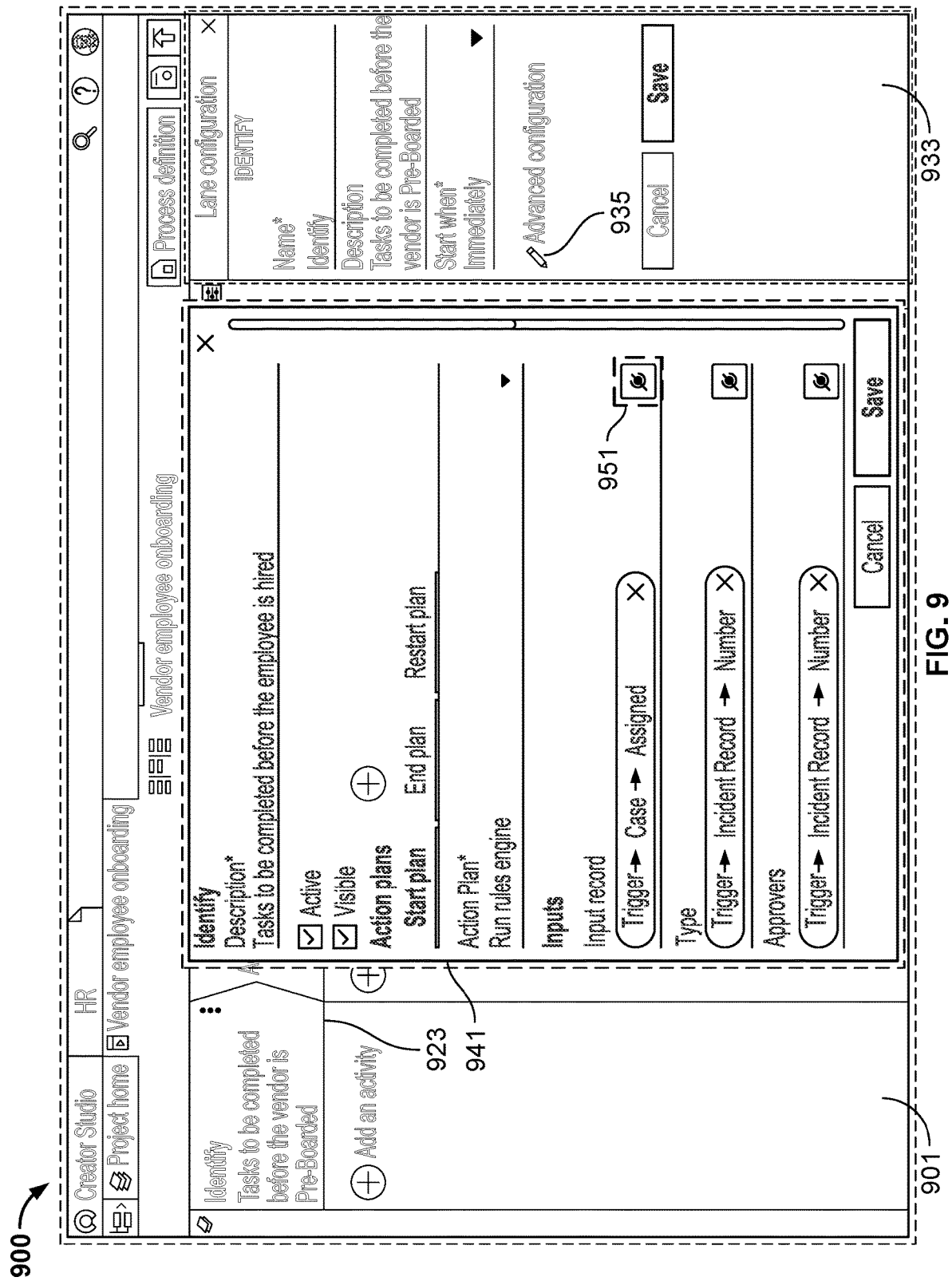
FIG. 9 is a diagram illustrating an example user interface of a workflow design tool for advanced configuration of a process.

FIG. 9 is a diagram illustrating an example user interface of a workflow design tool for advanced configuration of a process. In the example shown, user interface 900 is the user interface for a workflow design tool to visually create digital multi-process workflows. User interface 900 displays three process lanes including process lane 901. Process lane 901 includes process visual indicator 923, which is highlighted to indicate that process lane 901 is the selected process of the workflow. User interface 900 includes lane configuration dialog 933 with advanced configuration selection 935 both of which are not in focus. In various embodiments, lane configuration dialog 933 and advanced configuration selection 935 are lane configuration dialog 833 and advanced configuration selection 835 of FIG. 8. User interface 900 also includes advanced configuration user interface 941 that is the current active and in-focus user interface component for the user. User interface 900 is an example of a user interface presented to the user to modify advanced configuration settings of a process. For example, in some embodiments, user interface 900 and in particular advanced configuration user interface 941 are provided to a user when an advanced configuration selection such as advanced configuration selection 935 and/or advanced configuration selection 835 of FIG. 8 is invoked. In various embodiments, user interface 900 is created at least in part by utilizing the processes of FIGS. 2-6. In some embodiments, the user interface of FIG. 9 is implemented at least in part by an application server such as application server 121 of FIG. 1 via a client such as client 101, 103, and/or 105 of FIG. 1. In some embodiments, a user interacts with advanced configuration user interface 941 at 203 of FIG. 2, at 303 of FIG. 3, at 401 of FIG. 4, and/or at 607 of FIG. 6.

In the example shown, advanced configuration user interface 941 displays to the user and allows the user to modify configuration settings of a process. For example, a user can modify the description of the process, set the process to be active (or inactive), and set the process to be visible (or invisible). Using advanced configuration user interface 941, a user can configure an action plan such as a start, end, and/or restart action plan for the process. In some embodiments, the inputs of a process can be configured. For example, data including outputs of other processes and/or activities can be specified as inputs. In various embodiments, the user can also configure an input record, a process type, and process approvers. In some embodiments, a data reference dialog is made available to the user to present available reference data and to link the reference data to the current configuration setting. For example, a data reference dialog is used to link an output of an activity to the input of the process. In some embodiments, the data reference dialog is invoked using bullseye icon 951.

Figure 10:
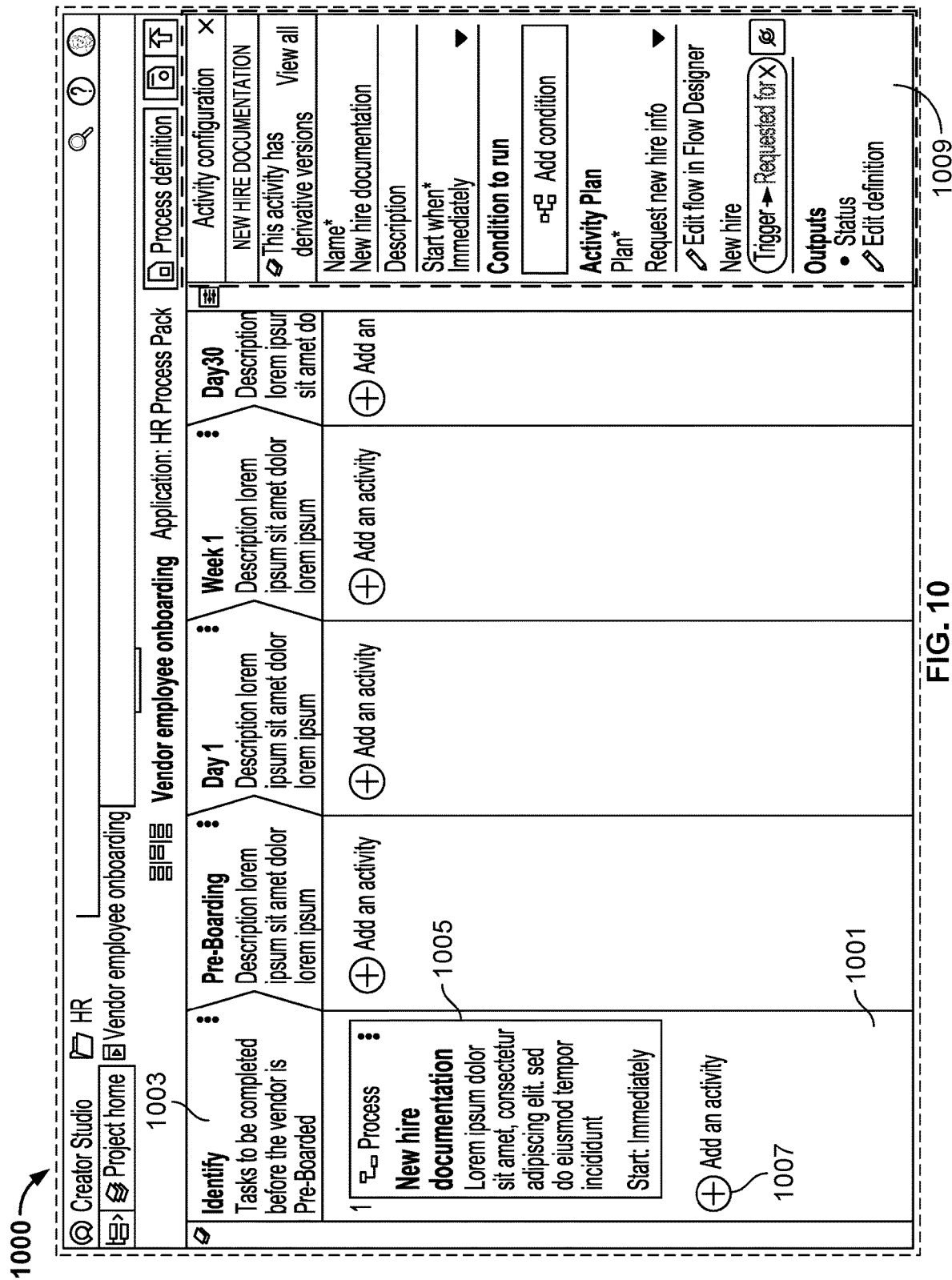
FIG. 10 is a diagram illustrating an example user interface of a workflow design tool for adding a new activity to a process.

FIG. 10 is a diagram illustrating an example user interface of a workflow design tool for adding a new activity to a process. In the example shown, user interface 1000 is the user interface for a workflow design tool to visually create digital multi-process workflows. The example of user interface 1000 is used to illustrate adding a new activity to a process. User interface 1000 displays multiple process lanes including process lane 1001. Process lane 1001 includes process visual indicator 1003, activity card 1005, and add activity button 1007. In some embodiments, at different stages of the workflow creation, process lane 1001 corresponds to process lane 701 of FIG. 7 and/or process lane 801 of FIG. 8, activity card 1005 corresponds to activity card 723 of FIG. 7, and add activity button 1007 corresponds to add activity button 821 of FIG. 8. User interface 1000 also includes activity configuration dialog 1009. In some embodiments, a user interacts with user interface 1000 at 205 of FIG. 2, at 303 of FIG. 3, at 503 and/or 505 of FIG. 5, and/or at 607 of FIG. 6.

In the example shown, activity card 1005 has been added to the process of process lane 1001. Activity card 1005 is highlighted to indicate it is selected. Activity card 1005 displays the name (New hire documentation), description (shown as a placeholder description), activity type (Process), and a start setting (start immediately) of the corresponding activity. In some embodiments, an activity card such as activity card 1005 includes a "more" icon depicted as a vertical line of dots that allows the user to modify the associated activity. For example, in some embodiments, the more icon opens an activity configuration dialog such as activity configuration dialog 1009. Using activity configuration dialog 1009, the activity corresponding to activity card 1005 can be modified. For example, using activity configuration dialog 1009, the name, description, start condition, a condition to run, an activity plan, and inputs can be configured. An input can be specified as a variable and be selected using a data reference dialog such as data reference dialog 1400 of FIG. 14. The data reference can be represented in the corresponding field using a bullseye icon. In some embodiments, more or fewer settings can be configured via an activity configuration dialog.

FIG. 11 is a diagram illustrating an example user interface of a workflow design tool for authoring of an activity definition. In the example shown, activity definition dialog 1100 is a user interface dialog for authoring an activity definition for a workflow process. In some embodiments, the activity definition can be reused across multiple processes and multiple workflows. Activity definition dialog 1100 may be accessed from a workflow design tool such as the workflow design tool described by the processes of FIGS. 2-6. For example, in some embodiments, activity definition dialog 1100 can be invoked from activity card 1005 and/or activity configuration dialog 1009 or via another appropriate trigger. In various embodiments, activity definition dialog 1100 is created at least in part by utilizing the processes of FIGS. 2-6. In some embodiments, the user interface of FIG. 11 is implemented at least in part by an application server such as application server 121 of FIG. 1 via a client such as client 101, 103, and/or 105 of FIG. 1. In some embodiments, a user interacts with user interface 1100 at 205 of FIG. 2, at 303 of FIG. 3, at 401 of FIG. 4, at 503 and/or 505 of FIG. 5, and/or at 607 of FIG. 6.

In various embodiments, activity definition dialog 1100 can be useful to create and/or modify a definition of an activity which may include configuring advanced settings of an activity. For example, a new activity definition can be created that is used as a template for inserting an instance of the activity into a process workflow. The activity definition can include default configurations such as default input fields and behaviors. Using activity definition dialog 1100, an action plan of an activity can be configured for the activity. In some embodiments, the name, a short description, a long description, a badge, an active (or inactive) setting, a wait for completion setting, a visible (or invisible) setting, and inputs, among other settings can be configured using activity definition dialog 1100. For example, a badge icon can be configured for an activity. The badge can be used as a visual indicator to associate the activity with a responsible party, a particular subject matter, or another reference. As an example, a human resources department badge is applied to an activity to reference the human resources department with a human resources activity. In some embodiments, a badge configuration can be inherited based on the configuration of the activity. As another example, a wait for completion setting can be configured to have the activity wait for completion before starting the next step or start and immediately move to the next step. The wait for completion setting can be used to configure an activity to run an action plan synchronously or asynchronously. As another example, using settings accessible via activity definition dialog 1100, a user can configure which inputs of an action plan are exposed and set defaults if appropriate. In some embodiments, a visibility setting configures whether certain data associated with the activity, such as inputs of an action plan, is hidden. When an instance of the activity definition is added to a process, the default values and behaviors of the activity definition are used.

In some embodiments, an administrator utilizing activity definition dialog 1100 can specify default values for the inputs of an activity. A default value can be a default reference value that is later populated with the appropriate reference value once an instance of the activity is added into a process. The populated reference/value is based on the context of the process/workflow into which the activity is added. For example, once an activity is added to a process, a data reference dialog such as data reference dialog 1400 of FIG. 14, allows a user to select from only the appropriate reference values matching the configured default value. A user including the activity in a process does not have to author/reauthor the inputs. The inputs are populated based on the predefined default values. In some embodiments, a default value can be configured based on a conditional rule, such as a trigger condition and/or utilizing a trigger record. The input for the activity instance can then be determined dynamically when the condition is evaluated. An input can be keyed off a trigger record that is triggered by, for example, the creation or update of a record for a particular database table.

FIG. 12 is a diagram illustrating an example user interface of a workflow design tool for displaying process execution. In the example shown, user interface 1200 is a simplified version of a workflow design tool user. Details of the user interface have been removed to focus on the process execution visual indicators. Using the concepts depicted by user interface 1200 and user interface 1300 of FIG. 13, a user can quickly visually determine the process execution order and dependency of the different processes of the workflow. User interface 1200 includes three process lanes, process lanes 1201, 1211, and 1221 of a multi-process workflow. Each process lane includes a process visual indicator such as process visual indicator 1203 for process lane 1201. Each process lane also includes different activity cards. For example, process lane 1201 includes activity cards 1205, 1207, and 1209. Process lane 1211 includes four activity cards and process lane 1221 includes two activity cards.

In the example shown, each process visual indicator of user interface 1200 is a chevron. Process visual indicator 1203 points to process lane 1211 and its corresponding process visual indicator. Similarly, the process visual indicator of process lane 1211 points to process lane 1221 and its corresponding process visual indicator. By utilizing a chevron user interface element as a visual indicator, user interface 1200 provides execution order information to the user. The execution order of a process lane with a chevron precedes the execution of the target process lane. In some embodiments, the target process lane has a process visual indicator that includes a visual target element portion that matches and is a target of the chevron. For example, the left sides of the process visual indicators for process lanes 1211 and 1221 have a concave left border that is indented to accommodate the chevron of the process lane that precedes it.

FIG. 13 is a diagram illustrating an example user interface of a workflow design tool for displaying process execution. In the example shown, user interface 1300 is a simplified version of a workflow design tool user interface. As with user interface 1200 of FIG. 12, details of the user interface of user interface 1300 have been removed to focus on the process execution visual indicators. Using the concepts depicted by user interface 1200 of FIG. 12 and user interface 1300, a user can quickly determine the process execution order of the different processes of the workflow. Similar to user interface 1200 of FIG. 12, user interface 1300 includes three process lanes, process lanes 1301, 1311, and 1321 of a multi-process workflow. Each process lane includes a process visual indicator such as process visual indicator 1303 for process lane 1301. Each process lane also includes different activity cards. For example, process lane 1301 includes activity cards 1305, 1307, and 1309. Process lane 1311 includes four activity cards and process lane 1321 includes two activity cards.

In the example shown, only process visual indicator 1303 of user interface 1300 is a chevron. Process visual indicator 1303 points to process lane 1311 and its corresponding process visual indicator to indicate that the process of process lane 1311 is executed after the process of process lane 1301. Unlike user interface 1200 of FIG. 12, the process visual indicators of process lanes 1311 and 1321 have a shared border and common boundary that include squared off or straight vertical edges. Instead of displaying a chevron and a matching receiving border, the boundary between the process visual indicators of process lanes 1311 and 1321 are straight vertical edges. By utilizing straight vertical borders, user interface 1300 provides execution order information to the user. The squared off user interface element portions along the common boundary indicate that process lanes 1311 and 1321 are run in parallel and that neither one precedes the other. In some embodiments, process lanes 1301, 1311, and 1321 are process lanes 1201, 1211, and 1221 of FIG. 12 after the execution condition of process lane 1321 is changed to run in parallel with process lane 1311.

In various embodiments, user interfaces 1200 of FIGS. 12 and 1300 of FIG. 13 are created at least in part by utilizing the processes of FIGS. 2-6. In some embodiments, user interfaces 1200 of FIGS. 12 and 1300 of FIG. 13 are implemented at least in part by an application server such as application server 121 of FIG. 1 via a client such as client 101, 103, and/or 105 of FIG. 1.

Figure 14:
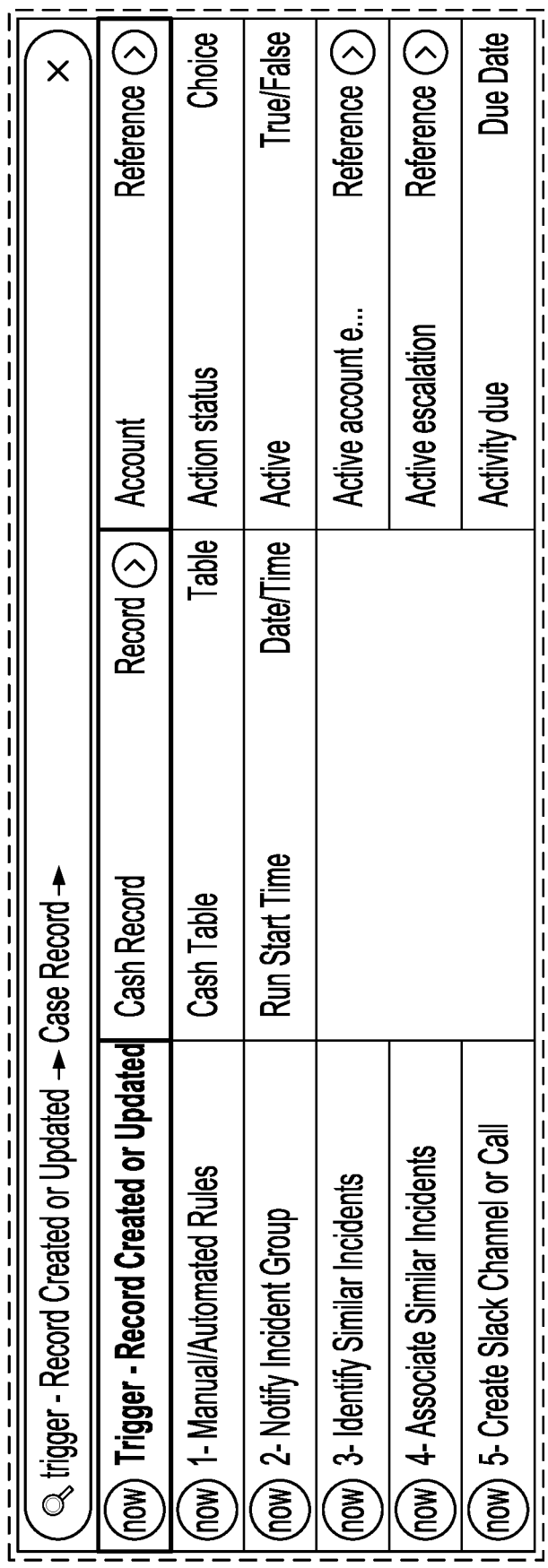
FIG. 14 is a diagram illustrating an example user interface of a workflow design tool for selecting reference data.

FIG. 14 is a diagram illustrating an example user interface of a workflow design tool for selecting reference data. In the example shown, data reference dialog 1400 is a user interface dialog for selecting and linking to reference data such as outputs of previous activities. For example, the input of an activity can reference the output of a previous activity. Data reference dialog 1400 can be implemented as a shared component library that can be accessible whenever a configuration setting can reference a data value. In some embodiments, data reference dialog 1400 is API driven. In various embodiments, data reference dialog 1400 is invoked via a bullseye icon such as bullseye icon 951 of FIG. 9. In various embodiments, data reference dialog 1400 is created at least in part by utilizing the processes of FIGS. 2-6. In some embodiments, data reference dialog 1400 is implemented at least in part by an application server such as application server 121 of FIG. 1 via a client such as client 101, 103, and/or 105 of FIG. 1. In some embodiments, a user interacts with data reference dialog 1400 at 203 and/or 205 of FIG. 2, at 303 of FIG. 3, at 401 of FIG. 4, at 503 and/or 505 of FIG. 5, and/or at 607 of FIG. 6.

In the example shown, data reference dialog 1400 includes a selection or search component field and multiple columns. The multiple columns allow a navigational user interface component to successively narrow the selection. The multiple columns allow a user to visually walk object data to select an appropriate reference field of an object. In some embodiments, data reference dialog 1400 is automatically populated with activity outputs from actions plans of previous activities. As changes are made to the workflow, the dependencies of the workflow can be dynamically updated and the selection options of data reference dialog 1400 can be updated accordingly. When configuring a workflow item corresponding to an activity, a user can browse and select from outputs of other workflow items configured to complete before the workflow item executes. In some embodiments, the selection or search field automatically filters the current level based on whether the field name contains a specified string.

FIG. 15 is a diagram illustrating an example user interface of a workflow design tool for selecting activities. In the example shown, activity selection dialog 1500 is a user interface dialog for selecting an activity from authored activities for adding to a workflow. In some embodiments, activity selection dialog 1500 is accessible from a workflow design tool and can be invoked via an add activity button of a process lane such as add activity button 821 of user interface 800 and/or add activity button 1007 of user interface 1000 of FIG. 10. In various embodiments, a selected activity of activity selection dialog 1500 is added to the corresponding process lane of the workflow. In some embodiments, the activities included in activity selection dialog 1500 are authored using activity definition dialog 1100 of FIG. 11. In some embodiments, activity selection dialog 1500 is created at least in part by utilizing the processes of FIGS. 2-6. In some embodiments, activity selection dialog 1500 is implemented at least in part by an application server such as application server 121 of FIG. 1 via a client such as client 101, 103, and/or 105 of FIG. 1. In some embodiments, a user interacts with activity selection dialog 1500 at 205 of FIG. 2, at 303 of FIG. 3, at 401 of FIG. 4, at 503 and/or 505 of FIG. 5, and/or at 607 of FIG. 6.

In the example shown, activity selection dialog 1500 includes a search bar and multiple panels. The search bar allows a user to specify a search query for selecting an activity. The provided search query can match against an activity name, description, installed category (i.e., installed spoke), and/or another appropriate field. As a search query is typed, matching search results can be displayed, and the corresponding matched text can be highlighted. Similarly, non-matches can be filtered out as the search query is typed. In some embodiments, the list of available activities is based on user criteria defined in an activity definition. The left panel of activity selection dialog 1500 shows categories (i.e., installed spokes) and each category can include a corresponding category icon. The categories panel allows the available activities to be grouped by scope. The middle panel of activity selection dialog 1500 shows activity names and each activity name can include a corresponding activity definition badge/icon. The right panel of activity selection dialog 1500 displays an associated description.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:

receiving an identification of a first workflow item grouping container, wherein the first workflow item grouping container is a part of a collection of workflow item grouping containers organizing an end-to-end multi-process workflow solution;

receiving an execution condition of the first workflow item grouping container;

receiving an identification of a second workflow item grouping container, wherein the second workflow item grouping container is a part of the collection of workflow item grouping containers of the end-to-end multi-process workflow solution;

receiving an execution condition of the second workflow item grouping container;

receiving a specification of one or more workflow items belonging to the first workflow item grouping container, wherein each of the one or more workflow items belonging to the first workflow item grouping container has an individually configurable execution condition and corresponds to a different individual activity of the end-to-end multi-process workflow solution;

receiving a specification of one or more workflow items belonging to the second workflow item grouping container, wherein each of the one or more workflow items belonging to the second workflow item grouping container has an individually configurable execution condition and corresponds to a different individual activity of the end-to-end multi-process workflow solution; and automatically generating and executing an application of the end-to-end multi-process workflow solution;

wherein the first workflow item grouping container is associated with a first process, the second workflow item grouping container is associated with a second process different from the first process, the first process and the second process are associated with different responsible parties, and the execution condition of the second workflow item grouping container for the second process is based at least in part on the first process of the first workflow item grouping container that is different from the second process.

2. The method of claim 1, wherein the execution condition of the first workflow item grouping container is associated with a start condition setting, and wherein the start condition setting is associated with at least one of the following: a start immediate setting, a start with previous setting, a start after previous setting, a start with dependent setting, or a start after dependent setting.

3. The method of claim 2, wherein the start condition setting of the execution condition of the first workflow item grouping container is associated with a start with delay configuration and a start with condition configuration.

4. The method of claim 1, wherein the execution condition of the first workflow item grouping container is associated with an action plan, and wherein the action plan includes a start action plan, an end action plan, and a restart action plan.

5. The method of claim 4, wherein the start action plan, the end action plan, and the restart action plan each is associated with a separate start condition setting.

6. The method of claim 5, wherein the each separate start condition setting is associated with at least one of the following: a start immediate setting, a start with previous setting, a start after previous setting, a start with dependent setting, or a start after dependent setting.

7. The method of claim 1, wherein the individually configurable execution condition of each of the one or more workflow items belonging to the first workflow item grouping container is associated with a start condition setting, and wherein the start condition setting is associated with at least one of the following: a start immediate setting, a start with previous setting, a start after previous setting, a start with dependent setting, or a start after dependent setting.

8. The method of claim 7, wherein the start condition setting of the individually configurable execution condition is associated with a start with delay configuration and a start with condition configuration.

9. The method of claim 1, wherein each of the one or more workflow items belonging to the first workflow item grouping container includes a run-time state.

10. The method of claim 9, wherein the run-time state is one of the following: a not started state, a started state, a completed state, or a skipped state.

11. The method of claim 1, wherein one of the one or more workflow items belonging to the first workflow item grouping container corresponds to a fulfillment request activity, notification activity, approval activity, catalog request activity, modify case activity, or running a script activity.

12. The method of claim 1, wherein one of the one or more workflow items belonging to the first workflow item grouping container provides data to a second one of the one or more workflow items belonging to the first workflow item grouping container.

13. The method of claim 1, wherein one of the one or more workflow items belonging to the first workflow item grouping container provides data to one of the one or more workflow items belonging to the second workflow item grouping container.

14. The method of claim 13, wherein the provided data to the one of the one or more workflow items belonging to the second workflow item grouping container is an output of the one of the one or more workflow items belonging to the first workflow item grouping container.

15. The method of claim 1, wherein the first workflow item grouping container and the second workflow item grouping container are configured to execute in parallel.

16. The method of claim 1, wherein one of the one or more workflow items belonging to the first workflow item grouping container is associated with a condition rule.

17. The method of claim 1, further comprising:

receiving an identification of a third workflow item grouping container, wherein the third workflow item grouping container is a part of the collection of workflow item grouping containers of the end-to-end multi-process workflow solution;

receiving an execution condition of the third workflow item grouping container; and receiving a specification of one or more workflow items belonging to the third workflow item grouping container, wherein each of the one or more workflow items belonging to the third workflow item grouping container has an individually configurable execution condition and corresponds to a different individual activity of the end-to-end multi-process workflow solution.

18. The method of claim 17, wherein the first workflow item grouping container and the second workflow item grouping container are configured to execute in parallel, and wherein the first workflow item grouping container and the third workflow item grouping container are configured to execute sequentially.

19. A system, comprising:
a processor; and
a memory coupled to the processor, wherein the memory is configured to provide the processor with instructions which when executed cause the processor to:
receive an identification of a first workflow item grouping container, wherein the first workflow item grouping container is a part of a collection of workflow item grouping containers organizing an end-to-end multi-process workflow solution;
receive an execution condition of the first workflow item grouping container;
receive an identification of a second workflow item grouping container, wherein the second workflow item grouping container is a part of the collection of workflow item grouping containers of the end-to-end multi-process workflow solution;
receive an execution condition of the second workflow item grouping container;
receive a specification of one or more workflow items belonging to the first workflow item grouping container, wherein each of the one or more workflow items belonging to the first workflow item grouping container has an individually configurable execution condition and corresponds to a different individual activity of the end-to-end multi-process workflow solution;
receive a specification of one or more workflow items belonging to the second workflow item grouping container, wherein each of the one or more workflow items belonging to the second workflow item grouping container has an individually configurable execution condition and corresponds to a different individual activity of the end-to-end multi-process workflow solution; and
automatically generate and execute an application of the end-to-end multi-process workflow solution;
wherein the first workflow item grouping container is associated with a first process, the second workflow item grouping container is associated with a second process different from the first process, the first process and the second process are associated with different responsible parties, and the execution condition of the second workflow item grouping container for the second process is based at least in part on the first process of the first workflow item grouping container that is different from the second process.

20. A computer program product, the computer program product being embodied in a non-transitory computer readable storage medium and comprising computer instructions for:
receiving an identification of a first workflow item grouping container, wherein the first workflow item grouping container is a part of a collection of workflow item grouping containers organizing an end-to-end multi-process workflow solution;
receiving an execution condition of the first workflow item grouping container;
receiving an identification of a second workflow item grouping container, wherein the second workflow item grouping container is a part of the collection of workflow item grouping containers of the end-to-end multi-process workflow solution;
receiving an execution condition of the second workflow item grouping container;
receiving a specification of one or more workflow items belonging to the first workflow item grouping container, wherein each of the one or more workflow items belonging to the first workflow item grouping container has an individually configurable execution condition and corresponds to a different individual activity of the end-to-end multi-process workflow solution; and
receiving a specification of one or more workflow items belonging to the second workflow item grouping container, wherein each of the one or more workflow items belonging to the second workflow item grouping container has an individually configurable execution condition and corresponds to a different individual activity of the end-to-end multi-process workflow solution; and
automatically generating and executing an application of the end-to-end multi-process workflow solution;
wherein the first workflow item grouping container is associated with a first process, the second workflow item grouping container is associated with a second process different from the first process, the first process and the second process are associated with different responsible parties, and the execution condition of the second workflow item grouping container for the second process is based at least in part on the first process of the first workflow item grouping container that is different from the second process.

* * * * *